(12) United States Patent
Sasaki

(10) Patent No.: US 7,716,447 B2
(45) Date of Patent: May 11, 2010

(54) SYSTEM, METHOD AND PROGRAM FOR SUPPORTING A COMPUTER SIZING HAVING N LEVEL HIERARCHICAL RESOURCES

(75) Inventor: Shigero Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 529 days.

(21) Appl. No.: 11/727,171

(22) Filed: Mar. 23, 2007

(65) Prior Publication Data

US 2007/0233996 A1    Oct. 4, 2007

(30) Foreign Application Priority Data

Mar. 29, 2006    (JP)    ............... 2006-090016

(51) Int. Cl.
*G06F 12/00*    (2006.01)
(52) U.S. Cl. ................ 711/170; 711/156; 711/158; 710/8; 710/15; 715/700
(58) Field of Classification Search ............... 711/170, 711/156, 158; 710/8, 15; 715/700
See application file for complete search history.

(56) References Cited

U.S. PATENT DOCUMENTS

| | | | |
|---|---|---|---|
| 6,347,366 B1 * | 2/2002 | Cousins | ........................ 711/170 |
| 7,376,549 B2 | 5/2008 | Horikawa | |
| 2004/0028070 A1 | 2/2004 | Barr et al. | |
| 2004/0199632 A1 | 10/2004 | Romero et al. | |
| 2005/0166081 A1 | 7/2005 | Etoh et al. | |
| 2007/0195700 A1 * | 8/2007 | Katoh et al. | ................. 370/235 |
| 2008/0222090 A1 * | 9/2008 | Sasaki | .......................... 707/2 |

FOREIGN PATENT DOCUMENTS

| | | |
|---|---|---|
| JP | 61-245273 | 10/1986 |
| JP | 63-259740 | 10/1988 |
| JP | 02-219138 | 8/1990 |
| JP | 03-108036 | 5/1991 |
| JP | 04-038522 | 2/1992 |
| JP | 05-151031 | 6/1993 |
| JP | 06-139065 | 5/1994 |
| JP | 08-202541 | 8/1996 |
| JP | 11-265306 | 9/1999 |
| JP | 2000-029753 A | 1/2000 |

(Continued)

OTHER PUBLICATIONS

S. Graham et al., "gprof: a Call Graph Execution Profiler," 1992 ACM, pp. 120-126.

*Primary Examiner*—Stephen C Elmore
(74) *Attorney, Agent, or Firm*—Foley & Lardner LLP

(57) ABSTRACT

A technique for supporting the sizing of hierarchical computer resources is provided. The sizing support system includes a memory, a table definition module and field calculation module. The memory stores lower level resource data which indicates the kinds and the maximum number of lower level resources belonging to the resources of each hierarchy level, and resource data which indicates parameters of resources of each hierarchy level. The processing is executed in a unit of three levels. In the unit process of three levels, the table definition module generates a table frame indicating the possible configurations of first resource by referring the lower level resource data. The field calculation module calculates the performance and cost of the configuration in the table frame by referring the resource data.

23 Claims, 29 Drawing Sheets

FOREIGN PATENT DOCUMENTS

| | | |
|---|---|---|
| JP | 2000-207255 A | 7/2000 |
| JP | 2002-183416 A | 6/2002 |
| JP | 2003-223335 A | 8/2003 |
| JP | 2004-078947 A | 3/2004 |
| JP | 2004-220453 A | 8/2004 |
| JP | 2004-288183 A | 10/2004 |
| JP | 2004-302525 A | 10/2004 |
| JP | 2005-190277 A | 7/2005 |

* cited by examiner

Fig. 7

30: UNIT PERFORMANCE DATA

THIRD LEVEL (K+2-TH LEVEL)

| KIND OF RESOURCE $R_{K+2}$ | UNIT PERFORMANCE $p_{K+2}$ |
|---|---|
| CPU-A | 100 |
| CPU-B | 100 |

Fig. 8

40: COST DATA

FIRST LEVEL (K-TH LEVEL)

| KIND OF RESOURCE $R_K$ | COST$c_K$ |
|---|---|
| cluster | 0 |

40-1

SECOND LEVEL (K+1-TH LEVEL)

| KIND OF RESOURCE $R_{K+1}$ | COST$c_{K+1}$ |
|---|---|
| 2-wayNODE | 473,000 |
| 4-wayNODE | 1,170,000 |

40-2

THIRD LEVEL (K+2-TH LEVEL)

| KIND OF RESOURCE $R_{K+2}$ | COST$c_{K+2}$ |
|---|---|
| CPU-A | 83,000 |
| CPU-B | 176,000 |

T10: TABLE FRAME

T10-a (2-way)

| K+1-TH LEVEL \ K+2-TH LEVEL | NUMBER OF RESOURCES $j$ ($M_{K+2}=2$) | |
|---|---|---|
| | 1 | 2 |
| NUMBER OF RESOURCES $i$ ($M_{K+1}=8$)  1 | | |
| 2 | | |
| 3 | | |
| 4 | | |
| 5 | | |
| 6 | | |
| 7 | | |
| 8 | | |

| K+1-TH LEVEL \ K+2-TH LEVEL | NUMBER OF RESOURCES $j$ ($M_{K+2}=4$) | | | |
|---|---|---|---|---|
| | 1 | 2 | 3 | 4 |
| NUMBER OF RESOURCES $i$ ($M_{K+1}=7$)  1 | | | | |
| 2 | | | | |
| 3 | | | | |
| 4 | | | | |
| 5 | | | | |
| 6 | | | | |
| 7 | | | | |

T10-b (4-way)

Fig. 12

T20: SCALE TABLE

T20-a (2-way)

| K+1-TH LEVEL \ K+2-TH LEVEL | | NUMBER OF RESOURCES j ($M_{K+2}$ =2) | |
|---|---|---|---|
| | | 1 | 2 |
| NUMBER OF RESOURCES i ($M_{K+1}$ =8) | 1 | 1 | 1.96 |
| | 2 | 1.92 | 3.7632 |
| | 3 | 2.76 | 5.4096 |
| | 4 | 3.52 | 6.8992 |
| | 5 | 4.2 | 8.232 |
| | 6 | 4.8 | 9.408 |
| | 7 | 5.32 | 10.4272 |
| | 8 | 5.76 | 11.2896 |

$S_{ij}$

T20-b (4-way)

| K+1-TH LEVEL \ K+2-TH LEVEL | | NUMBER OF RESOURCES j ($M_{K+2}$ =4) | | | |
|---|---|---|---|---|---|
| | | 1 | 2 | 3 | 4 |
| NUMBER OF RESOURCES i ($M_{K+1}$ =7) | 1 | 1 | 1.96 | 2.88 | 3.76 |
| | 2 | 1.92 | 3.7632 | 5.5296 | 7.2192 |
| | 3 | 2.76 | 5.4096 | 7.9488 | 10.3776 |
| | 4 | 3.52 | 6.8992 | 10.1376 | 13.2352 |
| | 5 | 4.2 | 8.232 | 12.096 | 15.792 |
| | 6 | 4.8 | 9.408 | 13.824 | 18.048 |
| | 7 | 5.32 | 10.4272 | 15.3216 | 20.0032 |

T30: PERFORMANCE TABLE

T30-a (2-way)

| K+1-TH LEVEL \ K+2-TH LEVEL | | NUMBER OF RESOURCES j ($M_{K+2}=2$) | |
|---|---|---|---|
| | | 1 | 2 |
| NUMBER OF RESOURCES i ($M_{K+1}=8$) | 1 | 100 | 196 |
| | 2 | 192 | 376.32 |
| | 3 | 276 | 540.96 |
| | 4 | 352 | 689.92 |
| | 5 | 420 | 823.2 |
| | 6 | 480 | 940.8 |
| | 7 | 532 | 1042.72 |
| | 8 | 576 | 1128.96 |

$P_{ij}$

T30-b (4-way)

| K+1-TH LEVEL \ K+2-TH LEVEL | | NUMBER OF RESOURCES j ($M_{K+2}=4$) | | | |
|---|---|---|---|---|---|
| | | 1 | 2 | 3 | 4 |
| NUMBER OF RESOURCES i ($M_{K+1}=7$) | 1 | 100 | 196 | 288 | 376 |
| | 2 | 192 | 376.32 | 552.96 | 721.92 |
| | 3 | 276 | 540.96 | 794.88 | 1037.76 |
| | 4 | 352 | 689.92 | 1013.76 | 1323.52 |
| | 5 | 420 | 823.2 | 1209.6 | 1579.2 |
| | 6 | 480 | 940.8 | 1382.4 | 1804.8 |
| | 7 | 532 | 1042.72 | 1532.16 | 2000.32 |

T40: COST TABLE

T40-a (2-way)

| K+1-TH LEVEL \ K+2-TH LEVEL | NUMBER OF RESOURCES $j$ ($M_{K+2}=2$) | |
|---|---|---|
| | 1 | 2 |
| NUMBER OF RESOURCES $i$ ($M_{K+1}=8$) — 1 | 556000 | 639000 |
| 2 | 1112000 | 1278000 |
| 3 | 1668000 | 1917000 |
| 4 | 2224000 | 2556000 |
| 5 | 2780000 | 3195000 |
| 6 | 3336000 | 3834000 |
| 7 | 3892000 | 4473000 |
| 8 | 4448000 | 5112000 |

$C_{ij}$

T40-b (4-way)

| K+1-TH LEVEL \ K+2-TH LEVEL | NUMBER OF RESOURCES $j$ ($M_{K+2}=4$) | | | |
|---|---|---|---|---|
| | 1 | 2 | 3 | 4 |
| NUMBER OF RESOURCES $i$ ($M_{K+1}=7$) — 1 | 1346000 | 1522000 | 1698000 | 1874000 |
| 2 | 2692000 | 3044000 | 3396000 | 3748000 |
| 3 | 4038000 | 4566000 | 5094000 | 5622000 |
| 4 | 5384000 | 6088000 | 6792000 | 7496000 |
| 5 | 6730000 | 7610000 | 8490000 | 9370000 |
| 6 | 8076000 | 9132000 | 10188000 | 11244000 |
| 7 | 9422000 | 10654000 | 11886000 | 13118000 |

10: LOWER LEVEL RESOURCE DATA

1ST LEVEL

| KIND OF RESOURCE $R_1$ | LOWER LEVEL RESOURCE $R_2$ | MAXIMUM NUMBER $M_2$ |
|---|---|---|
| cluster | · node-A<br>· node-B | · 16<br>· 12 |

10-1

2ND LEVEL

| KIND OF RESOURCE $R_2$ | LOWER LEVEL RESOURCE $R_3$ | MAXIMUM NUMBER $M_3$ |
|---|---|---|
| node-A | CPU-A | 2 |
| node-B | CPU-B | 4 |

10-2

3RD LEVEL

| KIND OF RESOURCE $R_3$ | LOWER LEVEL RESOURCE $R_4$ | MAXIMUM NUMBER $M_4$ |
|---|---|---|
| CPU-A | core-A | 1 |
| CPU-B | core-B | 2 |

10-3

4TH LEVEL

| KIND OF RESOURCE $R_4$ | LOWER LEVEL RESOURCE | MAXIMUM NUMBER |
|---|---|---|
| core-A | — | — |
| core-B | — | — |

20: SCALABILITY DATA

1ST LEVEL (20-1)

| KIND | NUMBER |
|---|---|
| cluster | N/A |

2ND LEVEL (20-2)

| KIND \ NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| node-A | 1.00 | 0.80 | 0.67 | 0.57 | 0.50 | 0.44 | 0.40 | 0.36 | 0.33 | 0.31 | 0.29 | 0.27 | 0.25 | 0.24 | 0.22 | 0.21 |
| node-B | 1.00 | 0.80 | 0.67 | 0.57 | 0.50 | 0.44 | 0.40 | 0.36 | 0.33 | 0.31 | 0.29 | 0.27 | | | | |

3RD LEVEL (20-3)

| KIND \ NUMBER | 1 | 2 | 3 | 4 |
|---|---|---|---|---|
| CPU-A | 1.00 | 0.94 | | |
| CPU-B | 1.00 | 0.95 | 0.91 | 0.87 |

4TH LEVEL (20-4)

| KIND \ NUMBER | 1 | 2 |
|---|---|---|
| core-A | 1.00 | |
| core-B | 1.00 | 0.98 |

Fig. 22

40: COST DATA

1ST LEVEL

| KIND OF RESOURCE $R_1$ | $COST_{c1}$ |
|---|---|
| cluster | 0 |

40-1

2ND LEVEL

| KIND OF RESOURCE $R_2$ | $COST_{c2}$ |
|---|---|
| node-A | 236,000 |
| node-B | 994,000 |

40-2

3RD LEVEL

| KIND OF RESOURCE $R_3$ | $COST_{c3}$ |
|---|---|
| CPU-A | 3,000 |
| CPU-B | 6,000 |

40-3

4TH LEVEL

| KIND OF RESOURCE $R_4$ | $COST_{c4}$ |
|---|---|
| core-A | 80,000 |
| core-B | 250,000 |

T20: SCALE TABLE

T20-a (CPU-A)

| | 4TH LEVEL | core-A | |
|---|---|---|---|
| 3RD LEVEL | | 1 | |
| CPU-A | 1 | 1.00 | |
| | 2 | 1.89 | |

T20-b (CPU-B)

| | 4TH LEVEL | core-B | |
|---|---|---|---|
| 3RD LEVEL | | 1 | 2 |
| CPU-B | 1 | 1.00 | 1.96 |
| | 2 | 1.90 | 3.73 |
| | 3 | 2.73 | 5.35 |
| | 4 | 3.48 | 6.82 |

Fig. 24

T30: PERFORMANCE TABLE

T30-a (CPU-A)

| 3RD LEVEL \ 4TH LEVEL | | core-A |
|---|---|---|
| CPU-A | 1 | 100 |
| | 2 | 189 |

T30-b (CPU-B)

| 3RD LEVEL \ 4TH LEVEL | | core-B | |
|---|---|---|---|
| | | 1 | 2 |
| CPU-B | 1 | 101 | 198 |
| | 2 | 192 | 377 |
| | 3 | 275 | 540 |
| | 4 | 351 | 689 |

Fig. 25

T40:COST TABLE

T40-a(CPU-A)

| 4TH LEVEL / 3RD LEVEL | | core-A |
|---|---|---|
| | | 1 |
| CPU-A | 1 | 319,000 |
| | 2 | 402,000 |

T40-b(CPU-B)

| 4TH LEVEL / 3RD LEVEL | | core-B | |
|---|---|---|---|
| | | 1 | 2 |
| CPU-B | 1 | 1,250,000 | 1,500,000 |
| | 2 | 1,506,000 | 2,006,000 |
| | 3 | 1,762,000 | 2,512,000 |
| | 4 | 2,018,000 | 3,018,000 |

Fig. 28

T30: PERFORMANCE TABLE

T30-a (2-way)

| K+1-TH LEVEL \ K+2-TH LEVEL | NUMBER OF RESOURCES j ($M_{K+2}=2$) | |
|---|---|---|
| | 1 | 2 |
| NUMBER OF RESOURCES i ($M_{K+1}=8$) 1 | | 196 |
| 2 | | 376.32 |
| 3 | | 540.96 |
| 4 | | 689.92 |
| 5 | | 823.2 |
| 6 | | 940.8 |
| 7 | | 1042.72 |
| 8 | | 1128.96 |

$P_{ij}$

T30-b (4-way)

| K+1-TH LEVEL \ K+2-TH LEVEL | NUMBER OF RESOURCES j ($M_{K+2}=4$) | | | |
|---|---|---|---|---|
| | 1 | 2 | 3 | 4 |
| NUMBER OF RESOURCES i ($M_{K+1}=7$) 1 | | 196 | 288 | 376 |
| 2 | | 376.32 | 552.96 | 721.92 |
| 3 | | 540.96 | 794.88 | 1037.76 |
| 4 | | 689.92 | 1013.76 | 1323.52 |
| 5 | | 823.2 | 1209.6 | 1579.2 |
| 6 | | 940.8 | 1382.4 | 1804.8 |
| 7 | | 1042.72 | 1532.16 | 2000.32 |

T40: COST TABLE

T40-a (2-way)

| K+1-TH LEVEL \ K+2-TH LEVEL | | NUMBER OF RESOURCES j ($M_{K+2}$ =2) | |
|---|---|---|---|
| | | 1 | 2 |
| NUMBER OF RESOURCES i ($M_{K+1}$ =8) | 1 | 556000 | 639000 |
| | 2 | 1112000 | 1278000 |
| | 3 | 1668000 | 1917000 |
| | 4 | 2224000 | 2556000 |
| | 5 | 2780000 | 3195000 |
| | 6 | 3336000 | 3834000 |
| | 7 | 3892000 | 4473000 |
| | 8 | 4448000 | 5112000 |

$C_{ij}$

T40-b (4-way)

| K+1-TH LEVEL \ K+2-TH LEVEL | | NUMBER OF RESOURCES j ($M_{K+2}$ =4) | | | |
|---|---|---|---|---|---|
| | | 1 | 2 | 3 | 4 |
| NUMBER OF RESOURCES i ($M_{K+1}$ =7) | 1 | 1346000 | 1522000 | 1698000 | 1874000 |
| | 2 | 2692000 | 3044000 | 3396000 | 3748000 |
| | 3 | 4038000 | 4566000 | 5094000 | 5622000 |
| | 4 | 5384000 | 6088000 | 6792000 | 7496000 |
| | 5 | 6730000 | | | |
| | 6 | | | | |
| | 7 | | | | |

$C_{ij}$

SYSTEM, METHOD AND PROGRAM FOR SUPPORTING A COMPUTER SIZING HAVING N LEVEL HIERARCHICAL RESOURCES

BACKGROUND OF THE INVENTION

1. Field of the Invention

The present invention relates to a sizing of hierarchical computer resources. More particularly, the present invention relates to a sizing support system, method and program for supporting the sizing for hierarchical computer resources of 3 hierarchy levels or more.

2. Description of the Related Art

The prices of the information processors such as the personal computer, workstation and the like (hereafter, referred to as nodes), which has one or more CPUs, memories and communication devices, have been reduced recently. As a result, the cluster constructed by combining (or clustering) a plurality of nodes to operate as one system becomes popular. In the cluster, the nodes are connected to and communicate with each other. The cluster is excellent in the cost performance and in the scalability.

The excellent scalability results from the characteristic that the cluster is hierarchical computer resources. The hierarchical resources are constructed from the computer resources provided with a plurality of hierarchy levels, and a resource of higher level (the higher level resource) is constituted by the combination of the resources of lower hierarchy level (the low level resources). The performance of a high level resource can be enhanced by increasing the number of low level resources or improving the performance of low level resources. For example, by increasing the number of the nodes constituting a cluster or improving the performance of the node, the performance of the cluster is enhanced. Thus, a cluster is hierarchical resources, and the nodes constituting the cluster are also hierarchical resources. This is because the increase in the number of the CPUs constituting a node or the improvement of the performance of the CPU improves the performance of the nodes.

Also, hierarchical resources having a uniform configuration are called as uniform hierarchical resources. For example, a cluster provided with only the nodes of the same kind is uniform hierarchical resources. Each of the nodes of the same kind is composed of the CPUs of the same kind and the same number. The actually used clusters are in many cases the uniform hierarchical resources.

It is important to consider the type of the resources to be employed and to determine the configuration of the hierarchical construction before constructing or enhancing the hierarchical resources. That is, in order to attain the processing performance necessary for the system, it is important to consider the types of the resources to be employed and to determine the configuration of the resource hierarchy. Such a process is called as sizing. The system which cannot provide the sufficient processing performance cannot provide sufficient services to clients. Thus, it is very important to execute the sizing at a high precision.

Typically, the sizing plan is experientially made on the basis of the sense and experience of skilled technicians. The processing performance of the hierarchical resources constituted in accordance with the sizing plan is estimated and compared with the processing performance required for the system. If the processing performance does not agree with the requirement, the sizing planning is executed again.

It is required that a technique which makes it possible to quantitatively execute the sizing of the hierarchical resources independently from the experience of technicians before construction or enhancing the hierarchical system. In particular, in many cases, clusters are the uniform hierarchical resources. Thus, the technique which supports the quantitative execution of the sizing of the uniform hierarchical resources is desired.

As the conventional technique related to the control and performance estimation of the computer resources after a computer system is constructed, the following techniques are known.

In Japanese Laid Open Patent Application (JP-P 2003-223335A), a virtual stand-alone outsourcing system is described. According to the virtual stand-alone outsourcing system, the computer resources are divided into a plurality of partitions, and the respective partitions are used by clients. Also, correspondingly to the performance information for each partition, the configuration of the partition is dynamically changed.

In Japanese Laid Open Patent Application (JP-P 2004-288183A), a method for automatically allocating computing resources in a partition server is described. According to the method, priorities are set for partitions. In accordance with the priority, the competition between the resources (CPUs) is solved, and the resource amount assigned to the partition is determined.

In Japanese Laid Open Patent Application (JP-P 2004-302525A) a performance balance evaluating apparatus of a computer system is described. A performance estimation index obtaining means individually transmits and receives a test application to and from each apparatus constituting an estimation target computer system. Then, the performance estimation index obtaining means changes the number of the test applications and obtains a transaction density and a performance estimation index of each apparatus. A use rate obtaining means transmits the test application to the estimation target computer system and instructs each apparatus to process such as a usual service application and obtains a use rate of each apparatus. A capacity calculating means divides the performance estimation index of each apparatus by each use rate and calculates the capacity of each apparatus. A performance balance evaluating means defines any one of the apparatuses as a standard apparatus and calculates a performance balance from a ratio between the capacity of a different apparatus and the allowable amount of the standard apparatus.

In Japanese Laid Open Patent Application (JP-P 2000-29753A), a performance evaluating method of a system having a hierarchical resource competition is described. In the hierarchical resources, a layer of a software resource is a higher order layer, and a layer of a hardware resource is a lower order layer. At first, the hardware configuration of the lower order layer is inputted. Next, a transaction data of a transaction using the software resource of the higher order layer is inputted. Next, a process data of a process constituting the software resource is inputted. Next, the restriction condition of the process is inputted. Next, the setting which shows what type of a performance estimation value is displayed in what type of a format is carried out. Next, whether or not the given data is sufficient for calculating the performance estimation value is checked. If it is sufficient, the performance estimation value to be determined under the restriction condition of the process of the higher order layer is calculated. Finally, a displaying means indicates those performance estimation values to a user.

In Japanese Laid Open Patent Application (JP-P 2004-78947A, having a counterpart U.S. Pat. No. 7,389,435), a method for satisfying the demanded capacity in a blade-based computer system is described. In the blade-based computer system, the number of loaded blades in the system is determined. Next, an optimal performance configuration for each of the individual blades is determined. The optimal performance configuration is based at least in part on the number of the blades loaded in the chassis and the overall thermal and power envelope. Then an individual frequency for at least one of the individual blades is set creating a more efficiently run system.

In Japanese Laid Open Patent Application (JP-P 2006-331135A, a performance prediction apparatus of a cluster system is described. The cluster system has nodes which share the data in a main storage device. The performance prediction apparatus calculates the frequency of block copy between the nodes, by which the data is copied by the unit of the memory block of the storage device per unit time. The clustering overhead occurred in the cluster system is calculated based on the frequency of the block copy and the information of the CPU load per block copy.

In a textbook (Kameda, H. (1998) The Elements and Applications of Performance Assessment, ISBN: 9784320026650, KYORITSU SHUPPAN CO., LTD. 28-30 (in Japanese)), the queuing theory for performance analysis is described.

SUMMARY OF THE INVENTION

The object of the present invention is to provide a technique for supporting a quantitative sizing of hierarchical resources before a system construction or enhancement.

According to the present invention, prior to the system construction or enhancement, the performance and cost of the hierarchical resources can be quantitatively estimated. Thus, prior to the system construction or enhancement, it is possible to execute the optimal sizing of the hierarchical resources at the good precision.

BRIEF DESCRIPTION OF THE DRAWINGS

FIG. 7 is a view showing an example of unit performance data;

FIG. 8 is a view showing an example of cost data;

FIG. 10 is a view showing an example of a generated table frame;

FIG. 12 is a view showing an example of a generated scale table;

FIG. 14 is a view showing an example of a generated performance table;

FIG. 16 is a view showing an example of a generated cost table;

FIG. 19 is a view showing an example of lower order resource data;

FIG. 20 is a view showing an example of scalability data;

FIG. 22 is a view showing an example of cost data;

FIG. 23 is a view showing an example of a generated scale table;

FIG. 24 is a view showing an example of a generated performance table;

FIG. 25 is a view showing an example of a generated cost table;

FIG. 28 is a view showing an example of a performance table generated in a third operation example; and FIG. 29 is a view showing an example of a cost table generated in the third example of operation.

DESCRIPTION OF THE PREFERRED EMBODIMENTS

A sizing support system, a sizing supporting method and a sizing support program according to the embodiments of the present invention will be described below with reference to the attached drawings. The target system of the sizing is a uniform hierarchical resources of n hierarchy levels (n is an integer of 3 or more). The cluster system is exemplified as the target system of the sizing. For example, in the case of a cluster system of 3 hierarchy levels, a resource of the first hierarchy (top hierarch level) is the cluster system itself, resources of the second hierarchy are nodes, and resources of the third hierarchy are CPUs. The cluster system may be a virtual cluster system. Also, the target of the sizing may be a multiprocessor system, a virtual server or a blade server.

1. Sizing support system

The system of the sizing target may have the configuration of various patterns depending on the kinds of employed hardware. The sizing support system according to this embodiment quantitatively calculates the performances and costs of the entire system, with regard to the various patterns. Moreover, the sizing support system according to this embodiment indicates the relation between the performances and costs for the various patterns for supporting the user's estimation and selection.

Figure 1:
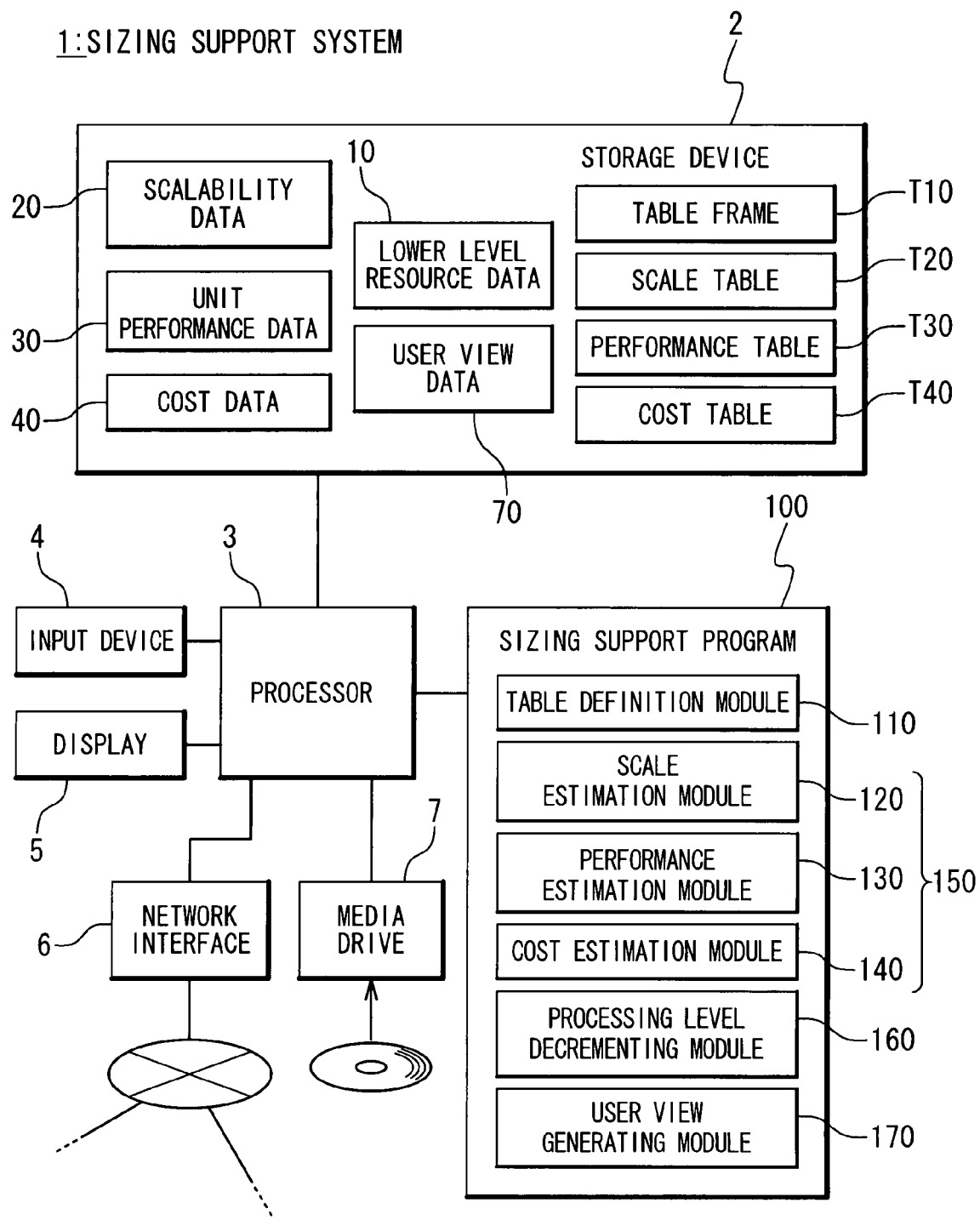
FIG. 1 is a block diagram showing the configuration of a sizing support system according to an embodiment of the present invention.

FIG. 1 is a block diagram showing the configuration of the sizing support system 1 according to this embodiment. The sizing support system 1 contains a storage device 2, a processor 3, an input device 4, a display 5, a network interface 6 and a media drive 7.

As the storage device 2, the random access memory and hard disc are exemplified. The storage device 2 stores lower level resource data 10, scalability data 20, unit performance data 30 and cost data 40. Those data may be inputted by the input device 4, or provided through the network interface 6. Or, those data may be recorded in a computer-readable recording medium and are read by the media drive 7. The storage device 2 further stores a table frame T10, a scale table T20, a performance table T30, a cost table T40 and a user view data 70. Those tables and data are mainly generated by the sizing support system 1.

The processor 3 includes CPU and carries out various processes and also controls the operations of each apparatus and each device. Also, the processor 3 executes a sizing support program 100 and attains the sizing support process in accordance with a command from the sizing support program 100.

The sizing support program 100 is recorded in, for example, the computer-readable recording medium and read by the media drive 7. Or, the sizing support program 100 may be provided through the network interface 6. The sizing support program 100 provides a table definition module 110, a scale estimation module 120, a performance estimation module 130, a cost estimation module 140, a processing level decrementing module 160 and a user view generating module 170, in linkage with the processor 3.

As the input device 4, the keyboard and the mouse are exemplified. As the display 5, a liquid crystal display is exemplified. The user, while referring to the information displayed on the display 5, can use the input device 4 and input the various data and commands.

Figure 2:
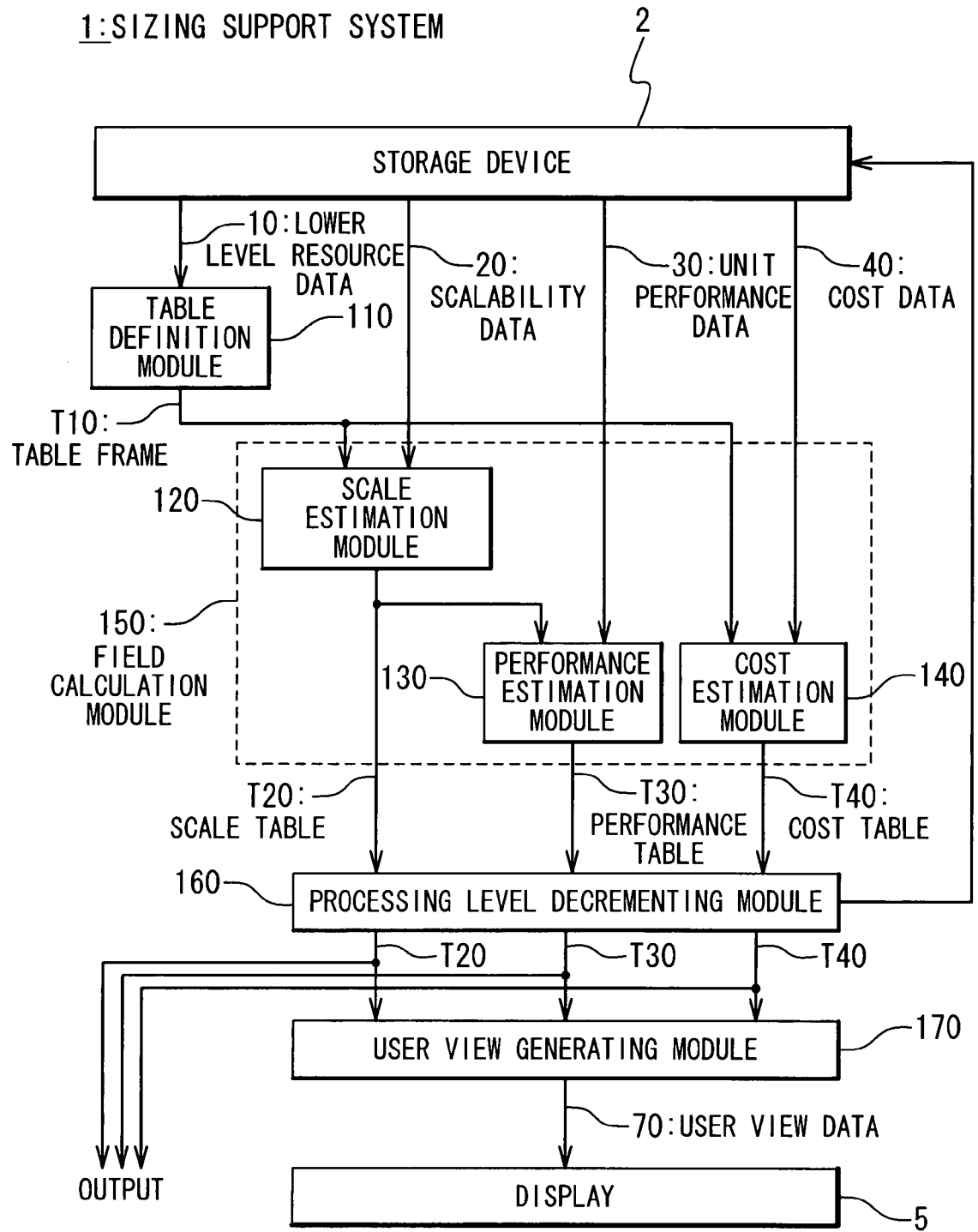
FIG. 2 is a block diagram showing a conceptual flow of data in the sizing support system according to an embodiment of the present invention.

FIG. 2 schematically shows the flow of the data in the sizing support system 1. The table definition module 110 reads the lower level resource data 10 from the storage device 2 and generates the table frame T10 in accordance with the lower level resource data 10. The table frame T10 is a frame of a table, and the generation of a table frame T10 corresponds to a definition of an array. The respective elements of the array, namely, the modules for calculating the respective fields of the table are the scale estimation module 120, the performance estimation module 130 and the cost estimation module 140. The scale estimation module 120, the performance estimation module 130 and the cost estimation module 140 are totally referred to as the field calculation module 150.

The scale estimation module 120 reads the table frame T10 and scalability data 20 from the storage device 2 and generates the scale table T20 in accordance with the read data. The performance estimation module 130 reads the scale table T20 and the unit performance data 30 from the storage device 2 and generates the performance table T30 in accordance with the read data. The cost estimation module 140 reads the table frame T10 and cost data 40 from the storage device 2 and generates the cost table T40 in accordance with the read data.

The generated tables T20 to T40 may be directly outputted from the sizing support system 1. Or, those tables T20 to T40 may be sent to the user view generating module 170. The user view generating module 170 correlates those tables T20 to T40 to each other and generates the user view data 70. The user view data 70 is displayed on the display 5. In the user view data 70, for example, the performance and cost of the entire system of the sizing target are correlated. The user can easily determine the proper hierarchical resource configuration by considering the relation between the performance and the cost which are displayed on the display 5.

2. Details of the Process

Figure 3:
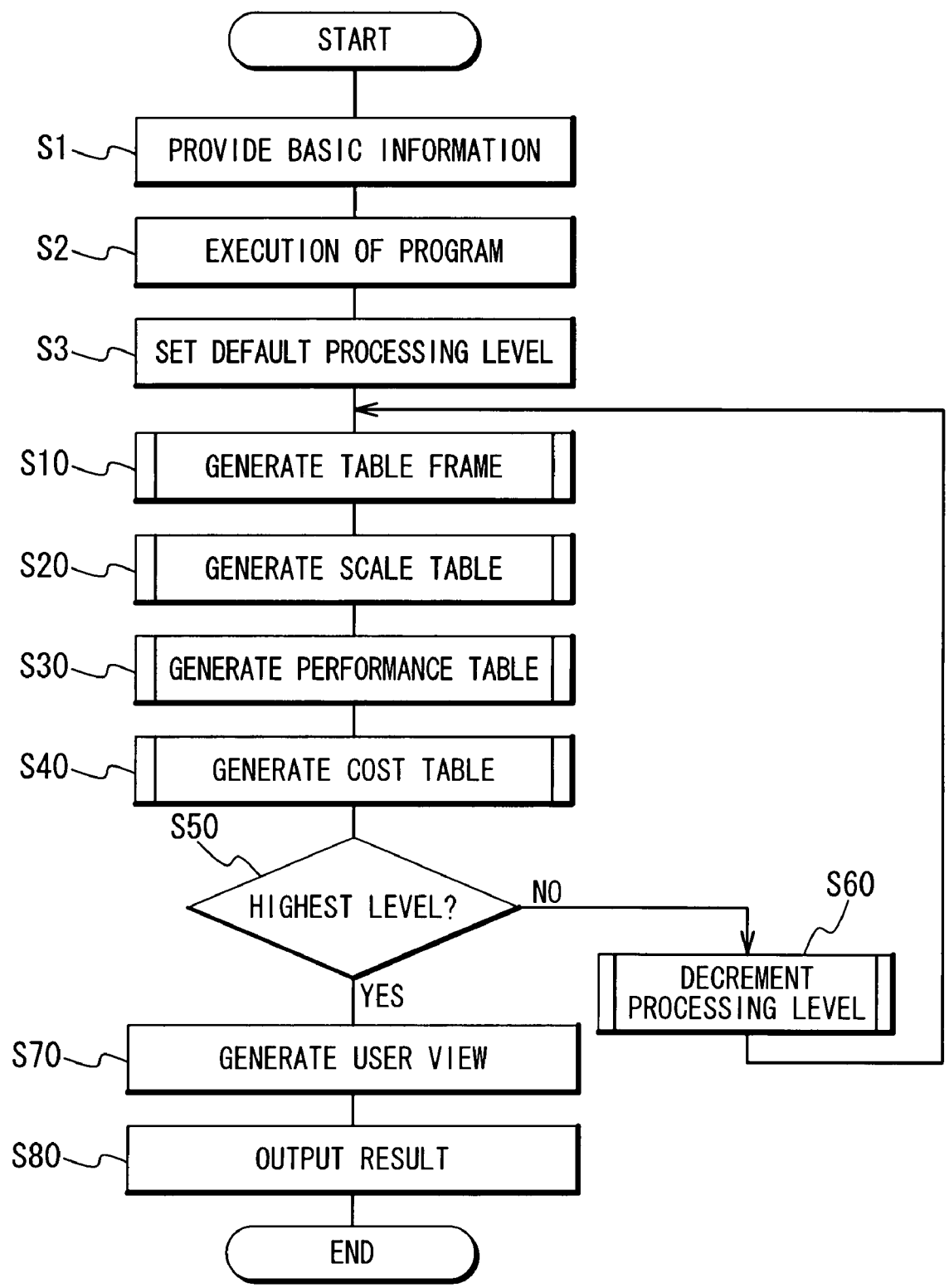
FIG. 3 is a flowchart showing a sizing supporting method according to an embodiment of the present invention.

The operations of the sizing support system 1 according to this embodiment will be described below in detail with reference to the flowchart shown in FIG. 3. The target of the sizing is a uniform sizing supporting of n hierarchies (n is an integer of 3 or more). As described later, the process is sequentially executed in which 3 hierarchies are treated as one unit. The 3 hierarchies of the process target will be referred to as the K-th hierarchy, the (K+1)-th hierarchy and the (K+2)-th hierarchy (K=1 to n−2). The process starts from the case of K=n−2 and is continued until K=1 is repeatedly carried out.

2-1. First Operation Example

Figure 4:
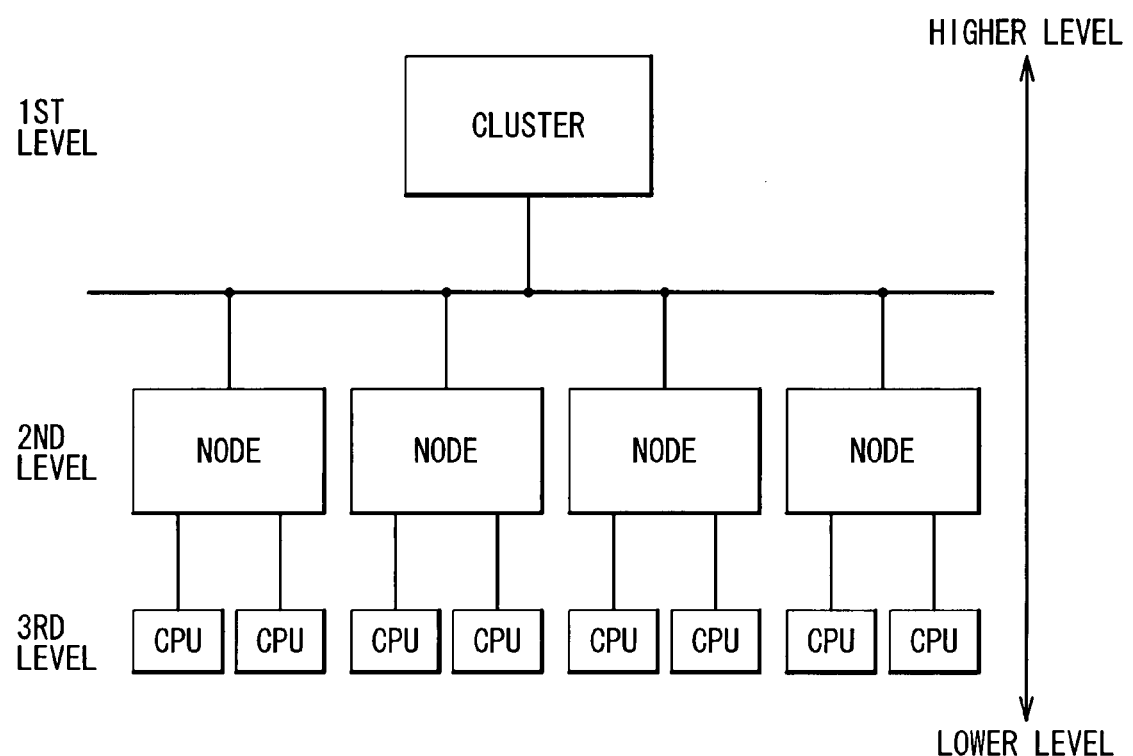
FIG. 4 is a conceptual view showing a hierarchy structure of a cluster which is a sizing target in the first example of an operation.

As the first example of the operation according to the present invention, the sizing of the cluster of the computer system having 3 hierarchy levels (n=3) is described. In this case, as shown in FIG. 4, the resource group of the first (top) hierarchy level includes only the cluster itself, the resource group of the second hierarchy level includes nodes, and the resource group of the third hierarchy level includes the CPUs. With reference to resources included in a resource group of a certain reference hierarchy level, a resource in the level one rank higher than the reference level is referred to as the higher level resource, and a resource in the level one rank lower than the reference level is referred to as the lower level resource. For example in this case, a node is a lower level resource of the cluster, and a CPU is a higher level resource of a node. In this example, the cluster is constituted by the nodes of the same kind. Also, each of the nodes is constituted by the CPUs of the same kind and the same number. Namely, the sizing target cluster in this embodiment consists of uniform hierarchical resources. Depending on the kinds of the employed CPUs and nodes, the clusters of the various patterns are consisted. The sizing support system 1 according to this embodiment enables to calculate the performances and costs of clusters of various patterns.

Step S1: Provision of Basic Information

At first, the basic information used in the process is inputted to the sizing support system 1 and stored in the storage device 2. The basic information includes the data indicating parameters with regard to the resources of the respective hierarchy levels and includes the lower level resource data 10, the scalability data 20, the unit performance data 30 and the cost data 40, which will be described below.

(Lower Level Resource Data 10)

Figure 5:
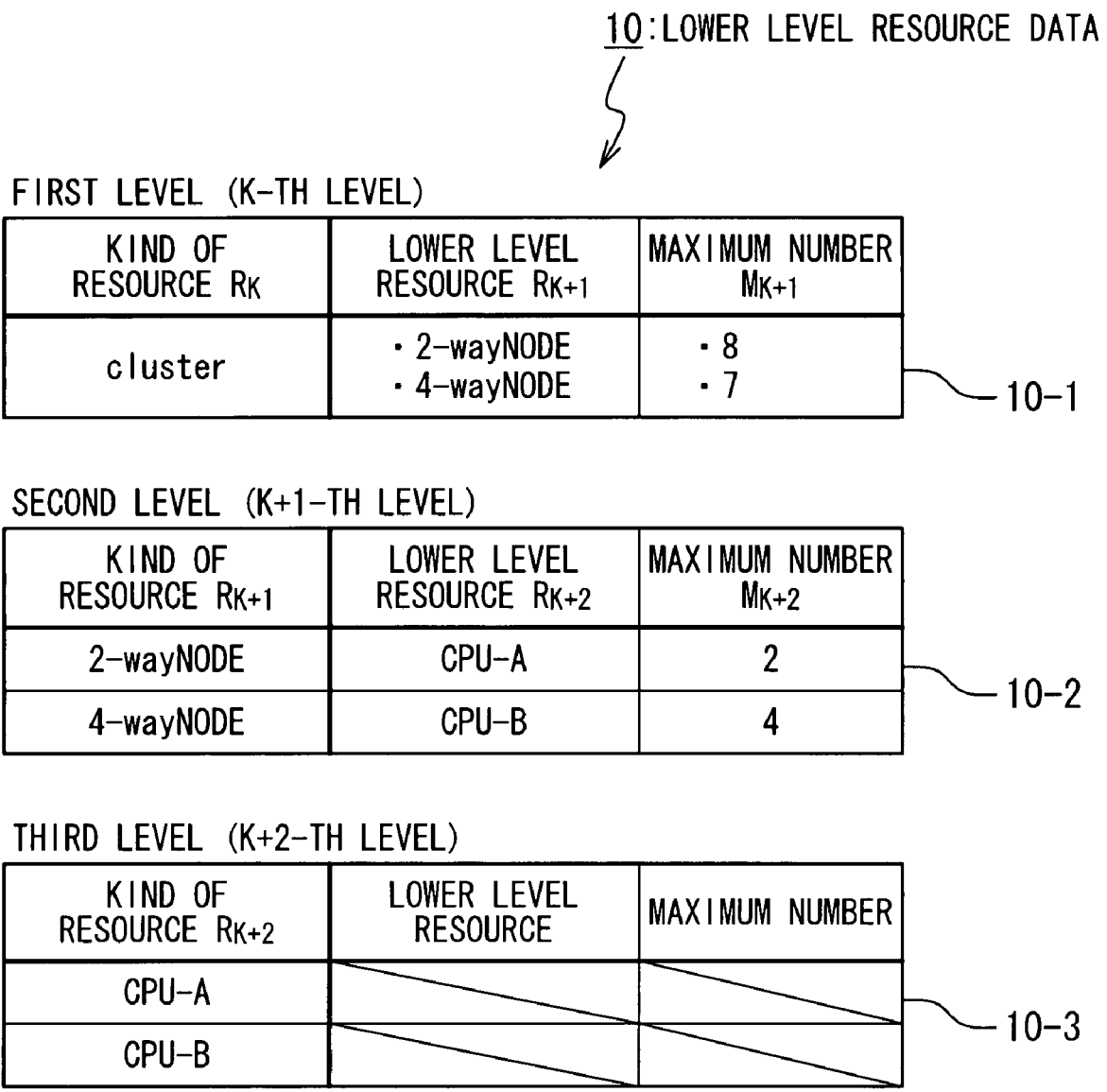
FIG. 5 is a view showing an example of lower level resource data.

FIG. 5 shows an example of the lower level resource data 10. The lower level resource data 10 indicates the possible kinds (or types) and maximum number of the 1-rank lower level resources which constitute the higher level resource for respective hierarchy levels. Specifically, with regard to the resources of each hierarchy, the kinds and maximum number of the lower level resources which can be possessed by the higher level resource are recorded.

For example, a lower level resource data 10-1 for the first hierarchy (K-th hierarchy) indicates the kind (identified by $R_{K+1}$) of the node that can constitute the cluster ($R_K$) and the maximum number ($M_{K+1}$) of the nodes. As the lower level resources of the cluster, two kinds of "2-way Node" and "4-way Node" are listed. The lower level resource data shown in FIG. 5 shows that a maximum of 8 2-way nodes or a maximum of 7 4-way nodes can be set in a cluster. A lower level resource data 10-2 for the second hierarchy level ((K+1)-th hierarchy) indicates the kind $R_{K+2}$ of the CPU that can constitute the node $R_{K+1}$ and the maximum number $M_{K+2}$ of the CPUs. The 2-Way node can possess a maximum of 2 CPU-A (CPU of type A). The 4-Way node can possess a maximum of 4 CPU-B. The lower level resource data 10-3 for the third hierarchy is not recorded since the third hierarchy level ((K+2)-th hierarchy) is the lowest layer.

(Scalability Data 20)

Figure 6:
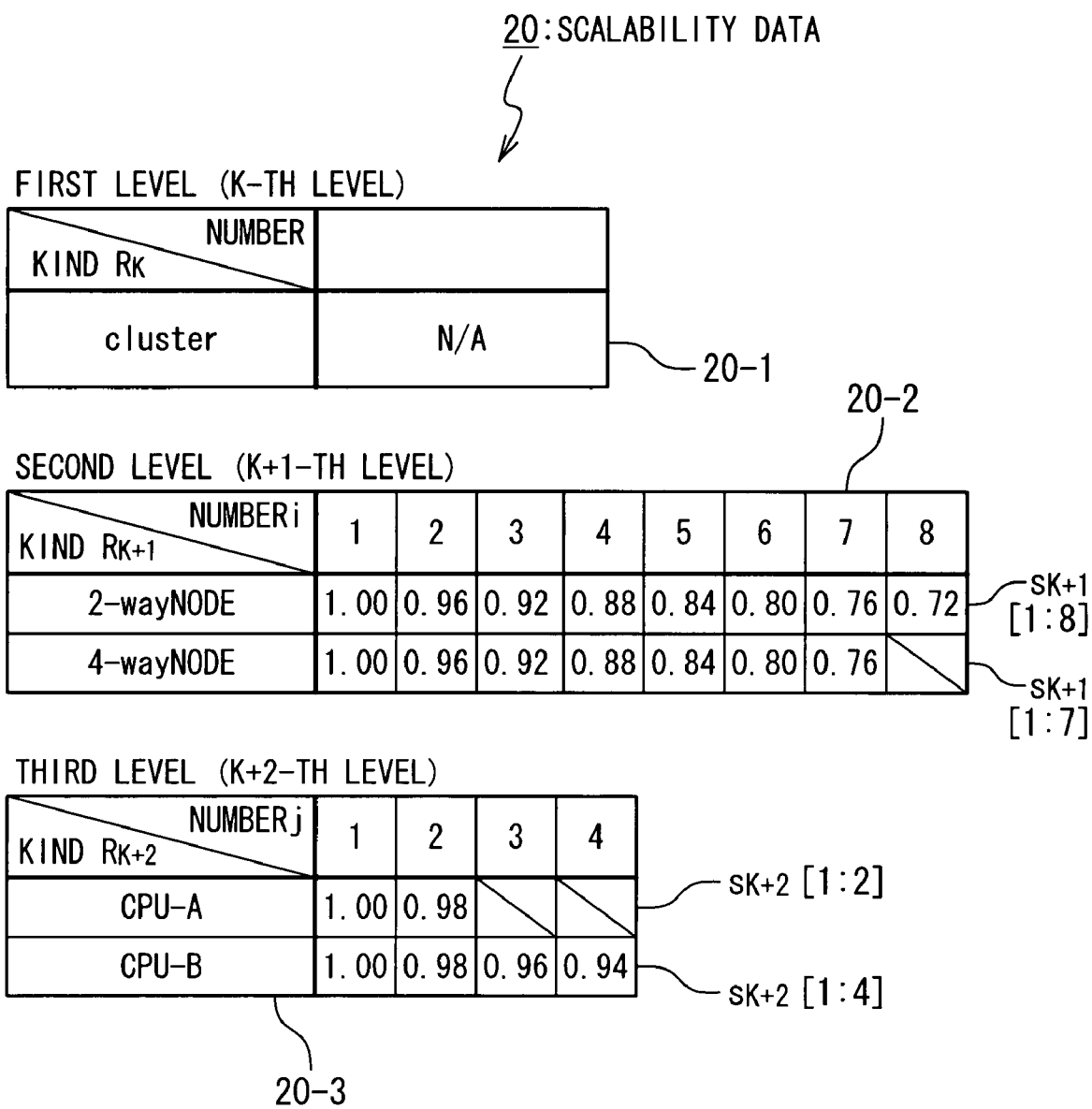
FIG. 6 is a view showing an example of scalability data.

FIG. 6 shows an example of the scalability data 20. Scalability implies the change rate of the performance with regard to the addition of each of the resources. In this embodiment, the scalability is defined as the value calculated by dividing the value which shows the performance of a resource by the N times the value which shows the performance of each of the N lower level resources which can be set in the higher level resource. For example, in the case that the a node process 100 requests per second and the cluster having 4 that kind of nodes process 350 requests per second, the scalability is 0.875 (=350/(4×100)). The scalability indicates the rate of change of the performance per resource in response to the number of the resources in a certain hierarchy.

For example, a scalability data 20-2 for the second hierarchy ((K+1)-th hierarchy level) indicates the relation between the kind $R_{K+1}$ of the node and the scalability based on the number (i: i=1 to $M_{K+1}$) of the nodes. The scalability of the 2-way node is given as a one-dimensional array data $s_{K+1}$ [1:8], and the scalability of the 4-way node is also given as a one-dimensional array data $s_{K+1}$ [1:7]. Also, a scalability data 20-3 for the third hierarchy ((K+2)-th hierarchy) indicates the relation between the kind $R_{K+2}$ of the CPU and the scalability based on the number (j: j=1 to $M_{K+2}$) of the CPUs. The scalability of CPU-A is given as a one-dimensional array data $s_{K+2}$ [1:2], and the scalability of CPU-B is given as a one-dimensional array data $s_{K+2}$ [1:4]. The kind and the maximum number is consistent with the lower level resource data 10 shown in FIG. 5. A scalability data 20-1 for the first hierarchy (K-th hierarchy level) is not recorded because it is the sole constituent of the top level.

(Unit Performance Data 30)

FIG. 7 shows an example of the unit performance data 30. This unit performance data 30 is given only to the third hierarchy level ((K+2)-th hierarchy) that is the lowest layer, and indicates unit performance ($p_{K+2}$) with regard to the kind $R_{K+2}$ of CPUs. The unit performance indicates the number of the requests that can be processed by the CPU in one second. In the example shown in FIG. 7, the unit performances of CPU-A and CPU-B are both 100.

(Cost Data 40)

FIG. 8 shows an example of the cost data 40. This cost data 40 indicates the cost with regard to the resources of each hierarchy level. The cost includes the price of hardware, the license price of software. A cost data 40-2 for the second hierarchy level ((K+1)-th hierarchy) indicates the kinds $R_{K+1}$ and costs $c_{K+1}$ of the nodes. A cost data 40-3 for the third hierarchy level ((K+2)-th hierarchy) indicates the kinds $R_{K+2}$ and the costs ($c_{K+2}$) of the CPUs. Also, a cost data 40-1 for the first hierarchy level (K-th hierarchy) indicates the kinds ($R_K$) and the costs ($c_K$) of the nodes. However, in this embodiment, since the K-th hierarchy level is the highest, the cost thereof $c_K$ is set to zero. The cost of the first hierarchy, namely, the cost of the cluster itself is one of the targets to be determined through the sizing support method.

Step S2: Execution of Program

Next, the sizing support program 100 is executed by the processor 3. Consequently, the respective modules shown in FIG. 2 are provided, and the processes are executed.

Step S3: Initial Setting of Process Hierarchy

The process is repeated with the 3 hierarchies (the K to K+2)-th hierarchies) as one unit. Hereafter, the 3 hierarchies that are the process targets are referred to as "process hierarchy". The process hierarchy is shifted in turn from the lower level (K=n-2) to the higher level (K=1). A processing level decrementing module 160 sets K to "n-2" as the initial setting of the process hierarchy level. In this example, since the sizing target has the 3 hierarchy levels, the process is repeated only one time. The hierarchy levels to be processed are the first hierarchy, the second hierarchy and the third hierarchy (K=1).

Step S10: Generation of Table Frame

The cluster of the sizing target may have the various configuration patterns, depending on the kinds and number of the employed nodes and CPUs. Thus, before estimating the performance and cost of the cluster, it is necessary to know the pattern types that may be possessed by the cluster. The patterns are defined in the table frame T10. The kinds and maximum number of the nodes that may be possessed by the cluster and the kinds and maximum number of the CPUs that may be possessed by the respective nodes are indicated in the lower level resource data 10 (shown in FIG. 5). Thus, by referring to the lower level resource data 10, it is possible to recognize the possible patterns of the cluster.

Figure 9:
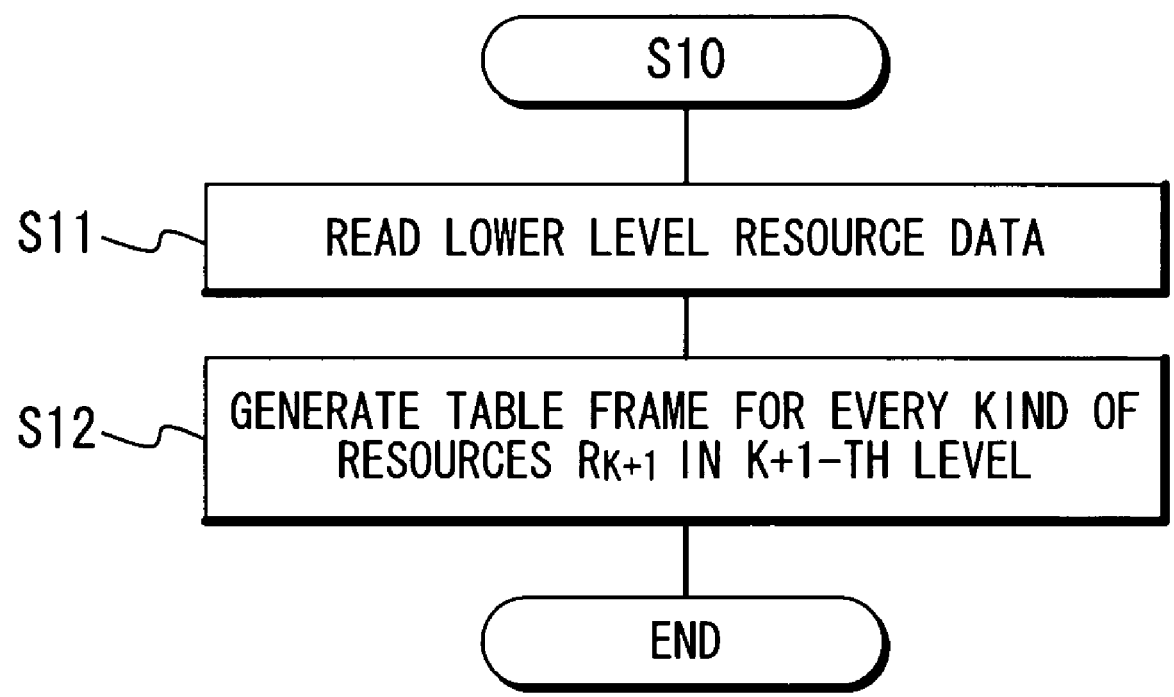
FIG. 9 is a flowchart showing a step S10 in detail.

As shown in FIG. 2, the table definition module 110 generates the table frame T10 in accordance with the lower level resource data 10. The flow is shown in FIG. 9 in more detail. At first, the table definition module 110 reads the lower level resource data 10 from the storage device 2 (Step S11). Next, the table definition module 110 generates table frames T10-$a$, T10-$b$, which are shown in FIG. 10, for each resource kind $R_{K+1}$ of the second hierarchy level (Step S12). The table frame T10-$a$ indicates the pattern when the 2-way node is employed in the cluster, and the table frame T10-$b$ indicates the pattern when the 4-way node is employed in the cluster.

Each table frame T10 is the frame of a two-dimensional table, and its column indicates the number of each kind of node i (i=1 to $M_{K+1}$) of the second hierarchy level ((K+1)-th hierarchy), and its row indicates the number of each kind of CPU j (j=1 to $M_{K+2}$) of the third hierarchy level ((K+2)-th hierarchy). For example, when the 2-way node is employed, the 2-way node may be constituted by a maximum of 2 CPU-A (refer to FIG. 5). Thus, the column of the table frame T10-$a$ indicates the number i (=1 to 8) of the 2-way nodes, and its row indicates the number j (j=1, 2) of the CPU-A. Similarly, the column of the table frame T10-$b$ indicates the number i (=1 to 7) of the 4-way nodes, and its row indicates the number j (j=1 to 4) of the CPU-Bs.

In this way, the table frame T10 indicates the configuration of the possible 44 configuration of the cluster. On the actual computer, the generation of the table frame T10 corresponds to the definition of the data array. As each of the elements of the array (namely, each of the fields of the table), the performance and the cost are calculated. That is, for each of the possible configuration of the cluster, the properties of the performance and the cost are calculated. The calculation is carried out by the field calculation module 150 (consisting of the scale estimation module 120, the performance estimation module 130 and the cost estimation module 140) which is described below.

Step S20: Generation of Scale Table

As shown in FIG. 2, the scale estimation module 120 generates the scale table T20 in accordance with the table frame T10 and scalability data 20. The scale table T20 is the table indicating performance magnification with regard to each of the possible configuration of the cluster. The performance magnification is the parameter indicating the magnification of the performance of the configuration, as compared with the case where the number of the lower level resources is 1. This performance magnification is calculated from the scalability and number of the lower level resources.

Figure 11:
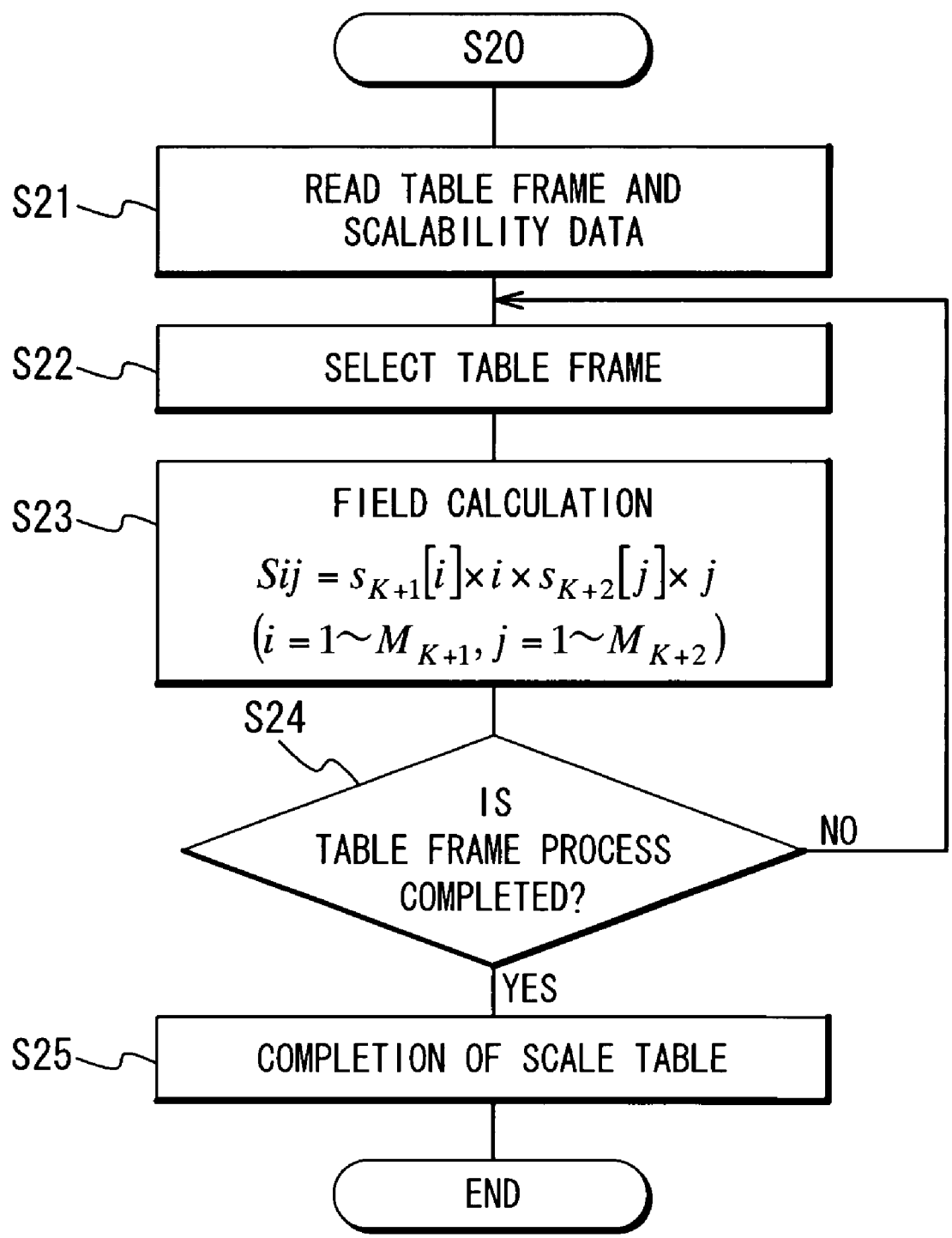
FIG. 11 is a flowchart showing a step S20 in detail.

The flow is shown in FIG. 11 in more detail. At first, the scale estimation module 120 reads the table frame T10 and the scalability data 20 from the storage device 2 (Step S21). Next, the scale estimation module 120 selects one table frame T10 (Step S22). Next, the scale estimation module 120 calculates a performance magnification $S_{ij}$ for each field (each pattern) of the selected table frame T10 (Step S23). Its performance magnification $S_{ij}$ is given by the following equation.

$$S_{ij}=s_{K+1}[i] \times s_{K+2}[j] \times j$$

Here, i is the node number (1 to $M_{K+1}$) of the second layer, and j is the CPU number (1 to $M_{K+2}$) of the third layer. Also, $S_{K+1}[i]$ is the scalability of the node based on the number i and is obtained from the scalability data 20-2 shown in FIG. 6. Similarly, $S_{K+2}[j]$ is the scalability of the CPU based on the number j, and is obtained from the scalability data 20-3 shown in FIG. 6.

With such a calculation, the scale table T20 corresponding to the selected table frame T10 is generated. FIG. 12 shows an example of the scale table T20 generated in this example. The scale tables T20-a, T20-b correspond to the table frames T10-a, T10-b, respectively. When the processes with regard to all of the table frames T10 have been completed (Step S24; Yes), the generating process for the table frame T10 is finished (Step S25)

Step S30: Generation of Performance Table

As shown in FIG. 2, the performance estimation module 130 generates the performance table T30 in accordance with the scale table T20 and unit performance data 30. The performance table T30 is the table indicating performance with regard to each of the possible configuration of the cluster.

Figure 13:
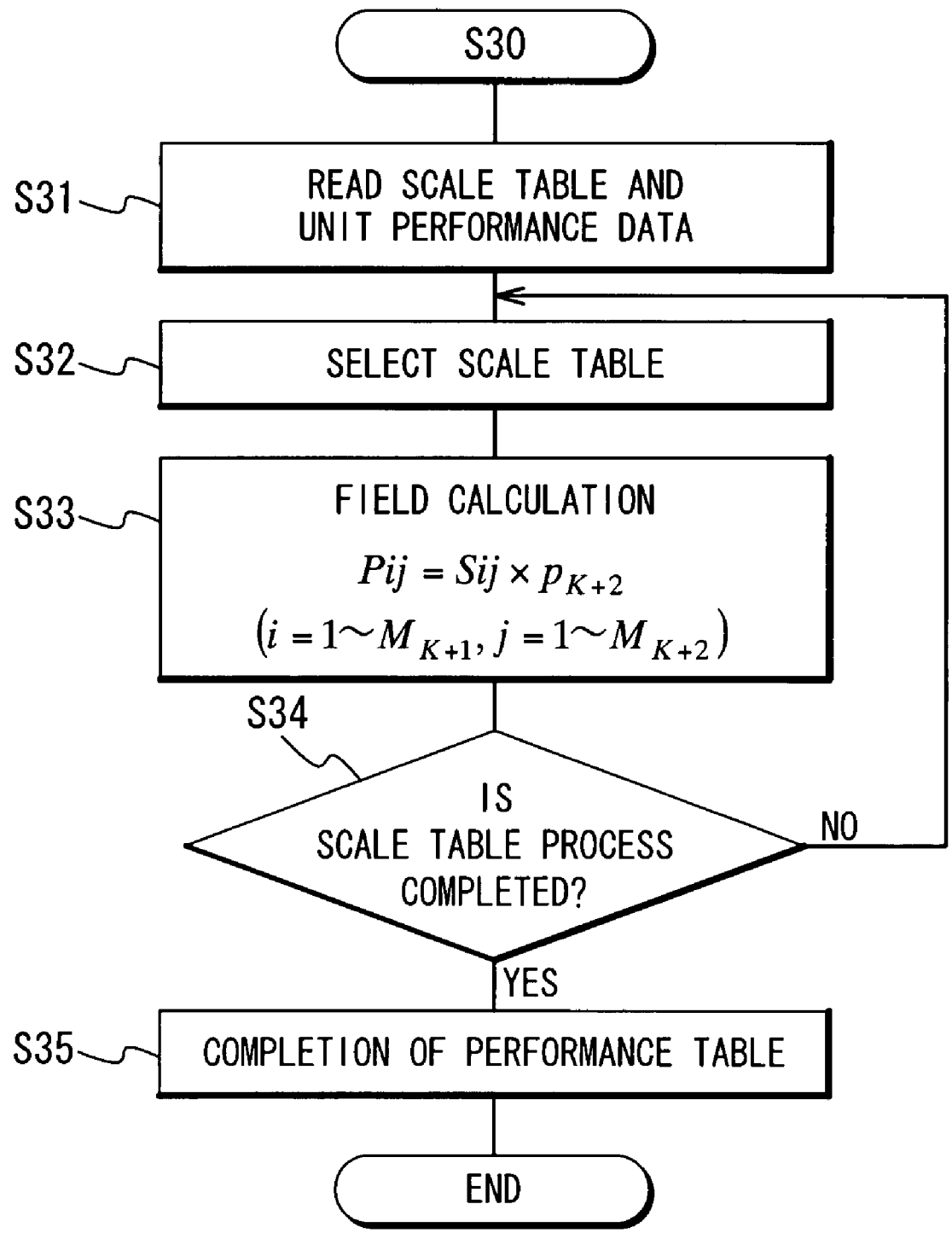
FIG. 13 is a flowchart showing a step S30 in detail.

FIG. 13 shows the flow in more detail. At first, the performance estimation module 130 reads the scale table T20 and the unit performance data 30 from the storage device 2 (Step S31). Next, the performance estimation module 130 selects one scale table T20 (Step S32). Next, the performance estimation module 130 calculates the performance $P_{ij}$ for each field (each pattern) of the selected scale table T20 (Step S33). The performance $P_{ij}$ is given by the following equation.

$$P_{ij}=S_{ij} \times p_{K+2}$$

Here, i is the node number (1 to $M_{K+1}$) of the second level, and j is the CPU number (1 to $M_{K+2}$) of the third level. Also, $P_{K+2}$ is the unit performance of the CPU, and is obtained from the unit performance data 30 shown in FIG. 7.

With such a calculation, the performance table T30 corresponding to the selected scale table T20 is generated. FIG. 14 shows the performance table T30 generated in this example. The performance tables T30-a, T30-b correspond to the scale tables T20-a, T20-b, namely, the table frames T10-a, T10-b, respectively. When the processes with regard to all of the scale tables T20 have been completed (Step S34; Yes), the generating process for the performance table T30 is finished (Step S35).

Step S40; Generation of Cost Table

As shown in FIG. 2, the cost estimation module 140 generates the cost table T40 in accordance with the table frame T10 and cost data 40. The cost table T40 is the table indicating cost with regard to each of the possible configuration of the cluster.

Figure 15:
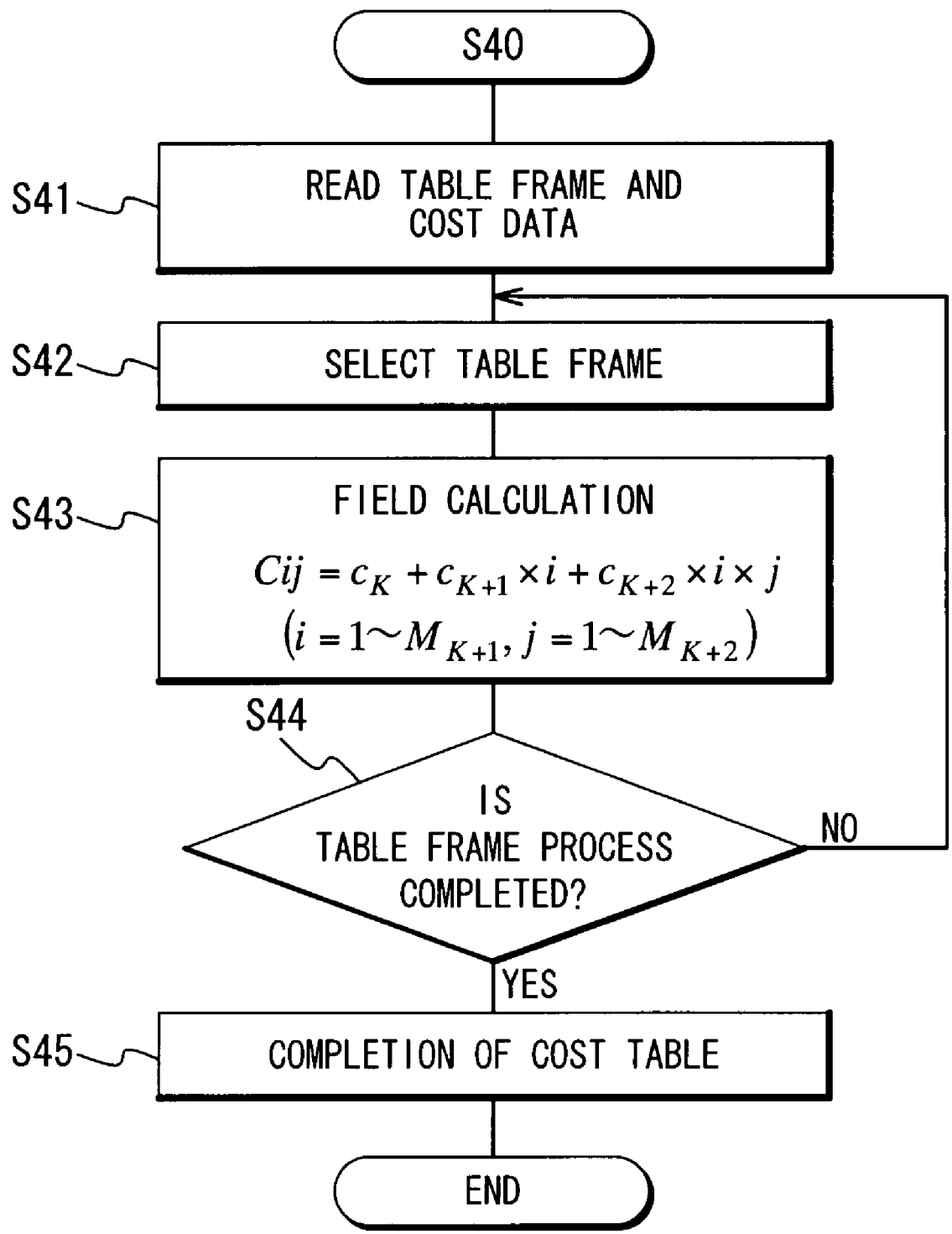
FIG. 15 is a flowchart showing a step S40 in detail.

FIG. 15 shows the flow in more detail. At first, the cost estimation module 140 reads the table frame T10 and the cost data 40 from the storage device 2 (Step S41). Next, the cost estimation module 140 selects one table frame T10 (Step S42). Next, the cost estimation module 140 calculates a cost $C_{ij}$ for each field (each pattern) of the selected table frame T10 (Step S43). The cost $C_{ij}$ is given by the following equation.

$$C_{ij}=c_K+c_{K+1} \times i+c_{K+2} \times i \times j$$

Here, i is the node number (1 to $M_{K+1}$) of the second level, and j is the CPU number (1 to $M_{K+2}$) of the third level. Also,  $c_K$, $c_{K+1}$ and $c_{K+2}$ are the costs of the nodes of the respective levels and are obtained from the cost data 40 shown in FIG. 8.

With such a calculation, the cost table T40 corresponding to the selected table frame T10 is generated. FIG. 16 shows the cost table T40 generated in this example. The cost tables T40-a, T40-b correspond to the table frames T10-a, T10-b, respectively. When the processes with regard to all the table frames T10 have been completed (Step S44; Yes), the generating process for the cost table T40 is finished (Step S45).

Also, in order to cope with the price change factor such as a temporal discount and the like, the cost table T40 may be directly given from outside. In such a case, the user uses the input device 4 for inputting the cost table T40. Or, the cost table T40 may be provided through a network or computer readable medium. The given cost table T40 has a format as shown in FIG. 16 and is stored in the storage device 2.

Step S50:

When K is 2 or more, namely, when the process hierarchy does not include the highest hierarchy level, a step S60 which will be described later is executed. In this operational example, since K=1 (Step S50; Yes), the process proceeds to a next step.

Steps S70, S80: Output of Result

All of the scale table T20, the performance table T30 and the cost table T40, which are generated by the above mentioned processes, indicate the important parameters quantitatively when the proper cluster configuration is selected. Those tables T20 to T40 may be displayed in their original states on the display 5 or may be recorded onto the recording medium by the media drive 7. The user can refer to those tables T20 to T40 and determine the cluster configuration which enables the desirable system.

Also, those tables T20 to T40 may be indicated to the user while they are correlated to each other. The user view generating module 170 correlates them. As shown in FIG. 2, the user view generating module 170 generates the user view data 70 by correlating the tables T20 to T40 to each other. For example, the user view data 70 indicates the relation between the performance and the cost, for each of the possible configuration of the cluster. The user view data 70 is given in a graph format or table format. The user view generating module 170 displays the user view data 70 on the display 5.

Figure 17:
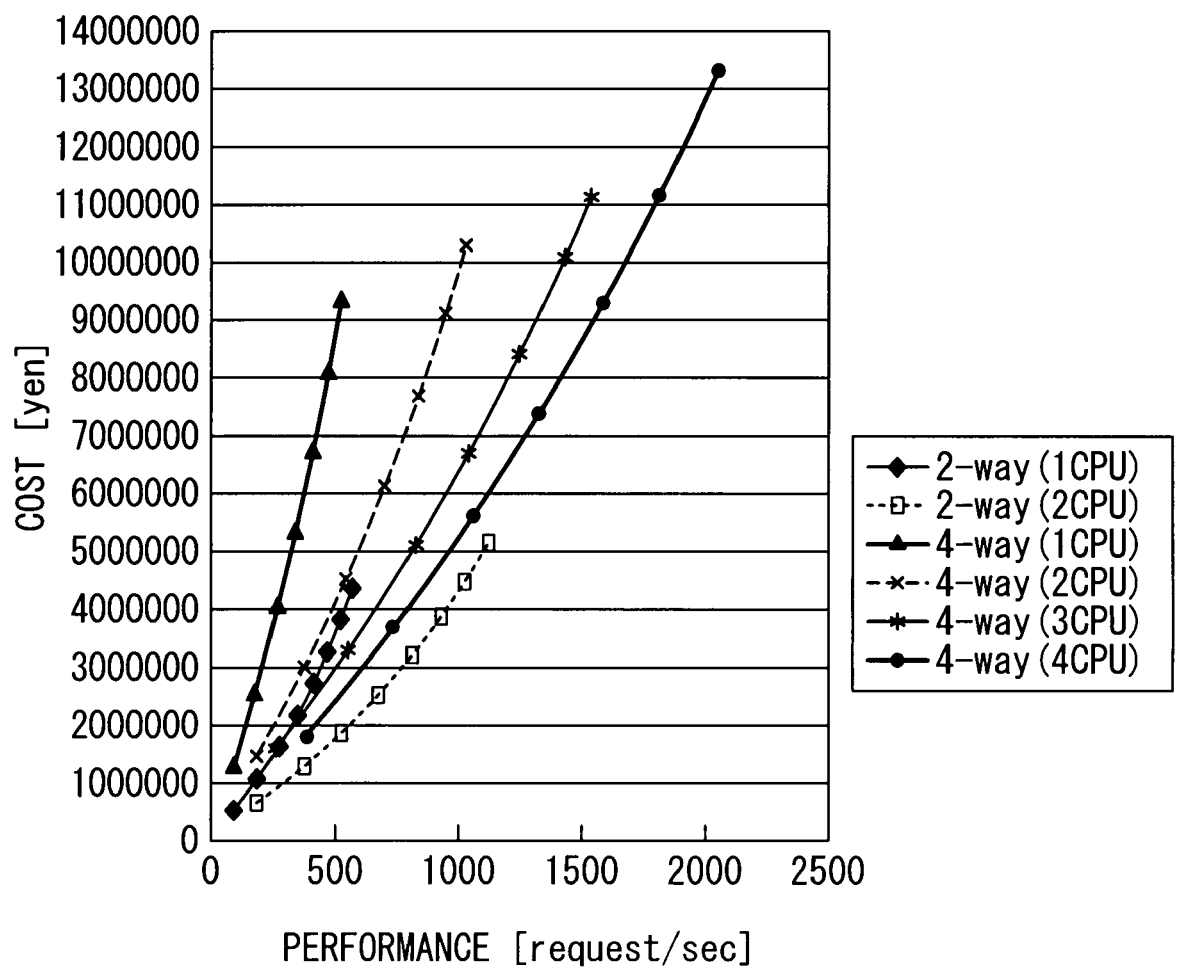
FIG. 17 is a view showing an example of a representation of a user view data.

FIG. 17 shows an example of the user view data 70 displayed on the display 5. In FIG. 17, the relation between the performance and cost of the cluster is shown in the graph format. The vertical axis of the graph indicates the cost of the cluster, and the horizontal axis indicates the performance of the cluster. The vertical axis may alternatively indicate the cost per performance (the value calculated by dividing the cost the performance). The points in the graph correspond to the field values of the tables T20 to T40. The points in the graph are linked through lines so that each kind of nodes are shown in series. For example, the relation of the case where the cluster is defined by the 4-way node having 2 CPU-B is represented by a group "4-way (2CPU)". In each group, the leftmost point indicates the case where the number of the nodes is 1, and the number of the nodes increases by one each moving to the rights.

The user can easily judge the kind of the node to be employed in order to constitute a desirable cluster, by referring to this graph. For example, if firstly a cluster having the performance of processing 500 requests per second is constructed and the enhancement to 1000 requests per second is scheduled, the user may employ any of 2-way (2CPU), 4-way (2CPU), 4-way (3CPU) and 4-way (4CPU). Also, if desiring to constitute the cheapest cluster, the user may employ the 2-way (2CPU).

Also, if desiring to enhance the cluster so as to be able to process 1500 requests per second, the user may employ any of the 4-way (3CPU) and the 4-way (4CPU). If desiring further to enhance the cluster cheaply, the user may select the 4-way (4CPU). Because, with regard to the 4-way (4CPU), although the initial expense is high, the future enhancement is easy in cost. On the other hand, with regard to the 2-way (1CPU), it is understood that, although the initial expense is cheap, the price becomes in a neck when this will be enhanced in future.

The representation for indicating the relation between the performance and the cost as mentioned above is also possible in the case of the hierarchical resource of 2 levels. In that case, as compared with the representation shown in FIG. 17, only the number of the lines is reduced.

As explained above, it is possible to easily determine the hierarchical resource configuration required to attain a desirable system. Before constituting the cluster, the user can estimate the future enhancement and determine the optimal cluster configuration from the viewpoint of the initial expense and the future extensibility. Thus, it is possible to avoid the lack of the providing capacity of the services caused from the increase of the number of requests in future.

2-2. Second Operation Example

Figure 18:
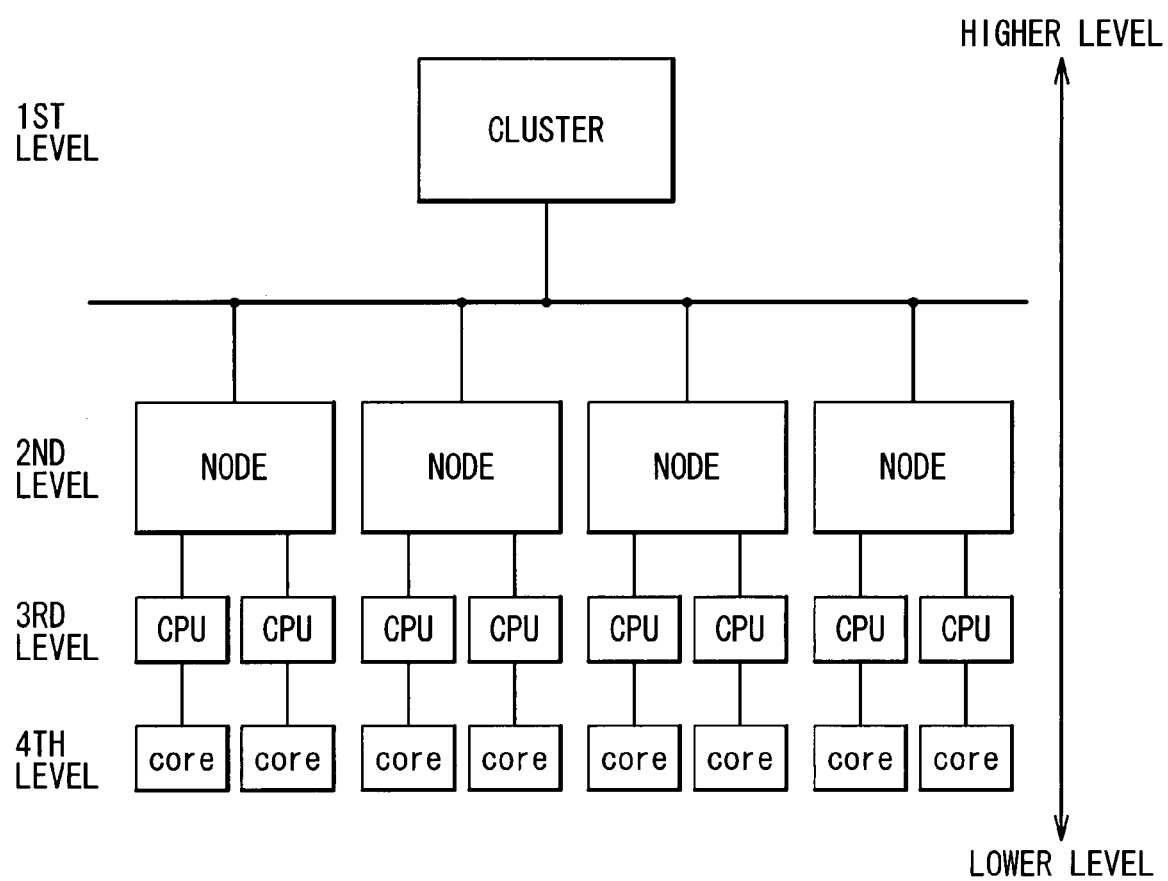
FIG. 18 is a conceptual view showing a hierarchy structure of a cluster which is a sizing target in the second example of operation.

Next, let us consider the case where the hierarchical resources of the sizing target has the 4 or more hierarchy levels. As an example, the sizing of the cluster of the 4 hierarchy levels (n=4) is explained. In this case, as shown in FIG. 18, the resource of the first hierarchy level is the cluster, the resources of the second hierarchy level is the nodes, the resources of the third hierarchy level is the CPUs, and the resources of the fourth hierarchy level is cores. The cluster is constituted by the nodes of the same kind, and the respective nodes are constituted by the CPUs of the same kind and the same number, and the respective CPUs are constituted by the cores of the same kind and the same number. The sizing target cluster in this example is the uniform hierarchical resources. Depending on the kinds of the employed resources, the clusters of the various patterns may be constructed. In the explanation in this example, the explanation for the operations essentially same to the first operation is omitted.

Figure 21:
FIG. 21 is a view showing an example of unit performance data.
Figure 26:
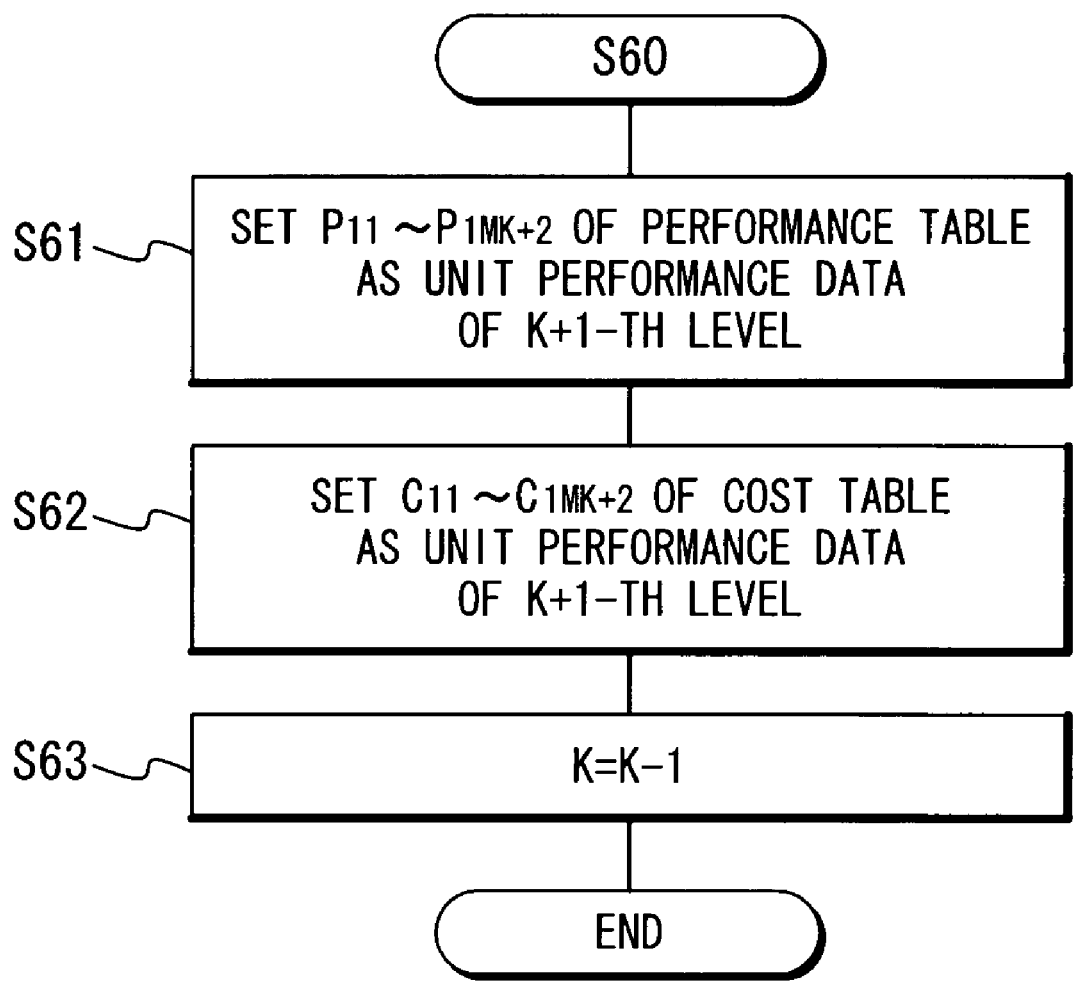
FIG. 26 is a flowchart showing a step S60 in detail.

The basic information inputted to the sizing support system 1 firstly at a step S1 is explained below. FIG. 19 shows an example of the lower level resource data 10. The lower level resource data 10 includes the lower level resource data 10-1 to 10-4 for the respective hierarchy levels. The lower level resource data 10-4 for the fourth hierarchy level which is the lowest level is not recorded. FIG. 20 shows an example of the scalability data 20. The scalability data 20 includes the scalability data 20-1 to 20-4 for the respective hierarchy levels. The scalability data 20-1 for the first hierarchy level that is the highest level is not recorded. FIG. 21 shows an example of the unit performance data 30. This unit performance data 30 is given only to the fourth hierarchy level which is the lowest level. FIG. 22 shows an example of the cost data 40. The cost data 40 includes the cost data 40-1 to 40-4 for the respective levels. The cost c1 of the first hierarchy level that is the highest level is set to "0".

At the initial setting (Step S3), K is set to 2 (=n-2). Thus, the process hierarchy levels in the first process are the second hierarchy level (K-th hierarchy), the third hierarchy level ((K+1)-th hierarchy) and the fourth hierarchy level ((K+2)-th hierarchy). After that, the processes similar to the first operation example are executed (Steps S10, S20, S30 and S40). As a result, the scale table T20, the performance table T30 and the cost table T40, with regard to the k-th hierarchy (second hierarchy), are generated.

FIG. 23 shows the scale table T20 generated by the first process. A scale table T20-$a$ corresponds to the case where the resources of the third hierarchy level are CPU-As. Its column indicates the number of CPU-As in the third hierarchy level, and the row indicates the number of core-As in the fourth hierarchy level. On the other hand, a scale table T20-$b$ corresponds to the case where the resources of the third hierarchy level are CPU-Bs. The column indicates the number of CPU-Bs in the third hierarchy level, and the row indicates the number of core-B in the fourth hierarchy. Each table indicates the performance magnification calculated for each of the various patterns.

Similarly, FIG. 24 shows the performance table T30 generated by the first process. Performance tables T30-$a$, T30-$b$ correspond to the cases where the resources of the respective third hierarchy level are CPU-A and CPU-B, respectively. Each of the tables indicates the performances calculated for each of the various patterns. Also, FIG. 25 shows the cost table T40 generated by the first process. Cost tables T40-$a$, T40-$b$ correspond to the cases where the resources of the third hierarchy level are CPU-A and CPU-B, respectively. Each of the tables shows the costs calculated for each of the various patterns.

Next, the step S50 is executed. At the step S50, k is not 1. That is, the processing hierarchy does not include the highest level (Step S50; No). In that case, the processing level decrementing module 160 changes the process hierarchy level (Step S60). FIG. 18 shows the flow at the step S60 in detail.

At the second process, the process hierarchy proceeds to the first to third hierarchies. The third hierarchy level is the lowest in the processing hierarchy, and the unit performance data 30 with regard to the third hierarchy level is required. Thus, according to this embodiment, the unit performance of the CPU in the third hierarchy level is extracted from the performance table T30 shown in FIG. 24. Specifically, from the performance table T30 shown in FIG. 24, the values of fields $P_{11}$ to $P_{1MK+2}$ (the portions surrounded with the dotted lines in FIG. 24) are referred. Those field values indicate the performances in the case where the number of the CPUs in the third hierarchy level is 1, namely, the unit performance of the third hierarchy level. Thus, the field values $P_{11}$ to $P_{1MK+2}$ of 3 kinds may be set as the unit performance data 30 for the third hierarchy level. The unit performance data 30 indicates the respective unit performances of the 3 kinds of (CPU-A, 1core-A), (CPU-B, 1core-B) and (CPU-B, 2core-B) (Step S61).

Similarly, the cost of the CPU in the third hierarchy level is extracted from the cost table T40 shown in FIG. 25. Specifically, from the cost table T40 shown in FIG. 25, the values of fields $C_{11}$ to $C_{1MK+2}$ (the portions surrounded with the dotted lines in FIG. 25) are referred. Those field values indicate the costs in the case where the number of the CPUs in the third hierarchy level is 1. Thus, the field values $C_{11}$ to $C_{1MK+2}$ of 3 kinds may be set as the cost data 40-3 for the third hierarchy level. The cost data 40-3 indicates the respective costs of the 3 kinds of (CPU-A, 1core-A), (CPU-B, 1core-B) and (CPU-B, 2core-B) (Step S62).

In this way, the processing level decrementing module 160 refers to the performance table T30 and the cost table T40, which are generated by the certain unit process, and consequently extracts the unit performance data 30 and the cost data 40-3 which are used by the next unit process. When the cost table T40 is given from outside, the processing level decrementing module 160 refers to the performance table T30 generated by the certain unit process and consequently extracts the unit performance data 30 that is used by the next unit process. In this way, the data generated by the certain unit process is fed back to the next unit process.

Next, the processing level decrementing module 160 carries out the decrement of K (Step S63). As a result, K becomes 1, and the process hierarchy level is shifted to the first to third hierarchy levels.

Next, the second process is performed on the first hierarchy level (K-th hierarchy), the second hierarchy level ((K+1)-th hierarchy) and the third hierarchy level ((K+2)-th hierarchy) which are the new process hierarchy level. Here, as the data with regard to the third hierarchy level which is the lowest level, the extracted data are used. The second process is also executed similarly to the foregoing operation examples (Steps S10, S20, S30 and S40). As a result, the scale table T20, the performance table T30 and the cost table T40 with regard to the first hierarchy level are generated. Since K is 1 (Step S50; Yes), the repetition of the process is finished. Then, in accordance with the finally-obtained tables T20 to T40, the user view data 70 is generated (Step S70), and its result is outputted to the display 5 (Step S80).

Figure 27:
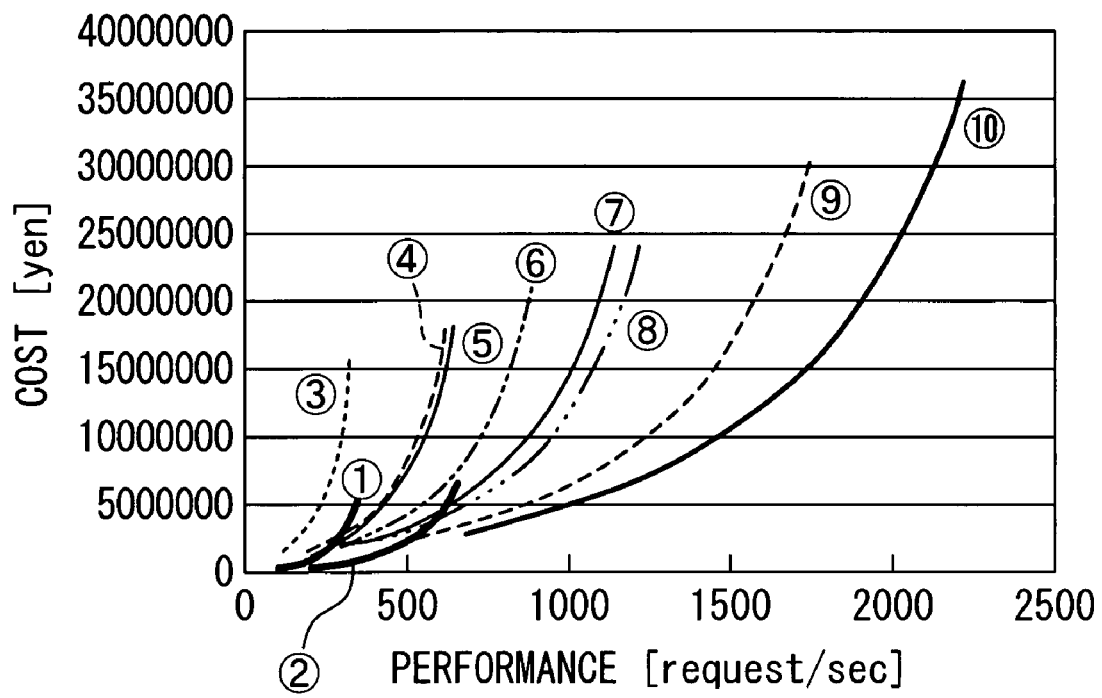
FIG. 27 is a view showing an example of representation of a user view data.

FIG. 27 shows an example of the displayed screen image in this example. In FIG. 27, the relation of the performances and costs of the cluster are indicated in a graph format. In the graph, for each node kind, the groups of 10 kinds of [1. node-A, 1CPU-A, 1core-A], [2. node-A, 2CPU-A, 1core-A], [3. node-B, 1CPU-B, 1core-B], [4. node-B, 2CPU-B, 1core-B], [5. node-B, 1CPU-B, 2core-B], [6. node-B, 3CPU-B, 1core-B], [7. node-B, 4CPU-B, 1core-B], [8. node-B, 2CPU-B, 2core-B], [9. node-B, 3CPU-B, 2core-B] and [10. node-B, 4CPU-B, 2core-B] are indicated.

Even in the case where the sizing target is 5 hierarchy levels or more, the similar process is performed. The data obtained by a certain process is fed back as the data with regard to the lowest hierarchy level (the (K+2)-th hierarchy) in a next process. The repetition of the processes enables the estimation of the entire performance and cost of the n hierarchy levels.

2-3. Third Operation Example

The calculations of the performance and the cost are not required to be performed on all of the patterns that may be employed to constitute the cluster. The performance and the cost may be calculated only for a part of the configuration patterns of the cluster. For example, in the case where the excellent performance is required, the system where the number of the resources is small is considered to be unable to attain the required performance. Thus, in order to reduce the calculation, the calculation of the pattern where the number of the resources is small can be skipped for deriving enough information. FIG. 28 shows an example of the performance table T30 generated in this operation example, and this corresponds to FIG. 14 illustrated in the first operation example. In FIG. 28, the performance where the number of the CPUs in the third hierarchy level is 1 is not calculated. The user obtains only the pattern where the performance is relatively high.

Also, in the case where the system of the relatively low cost is required, the calculation of the pattern where the cost becomes excessively high can be skipped. For example, if the cost exceeds a predetermined target value during the calculation, the calculation for that group is finished. FIG. 29 shows an example of the cost table T40 generated in this operation example and corresponds to FIG. 16 illustrated in the first operation example. In FIG. 29, the pattern where the cost exceeds 8,000,000 yens is not shown. According to the third operation example, the calculation can be reduced. Moreover, the plot with regard to the pattern far away from the required system is not indicated. Thus, the user can easily view the result and determine the optimal configuration.

3. Effect

As explained above, according to this embodiment, it is possible to quantitatively estimate the performance and cost of the uniform hierarchical resources of the 3 hierarchies or more. Thus, it is possible to precisely execute the sizing estimation of the hierarchical resources before constructing the hierarchical computer system. Also, according to this embodiment, the relation between the performance and cost of the hierarchical resources can be provided to the user simply and easily. The user can easily determine the configuration of the proper hierarchical resources by considering the provided information. The user can determine the optimal configuration from the viewpoint of the initial cost and the future extensibility before constructing the cluster system. Hence, it is possible to avoid the lack of the provision capacity for coping with the requirements which may be increased in future. In this way, the sizing is supported.

In the above-mentioned embodiments, the cost data 40 indicating the price of each resource is used. The heat amount data indicating the heat amount discharged by each resource may be used instead of the cost data 40. The format of the heat amount data is similar to the cost data 40, and the processing can be carried out similarly. In this case, the relation between the performance and heat amount of the hierarchical resources of the cluster can be quantitatively provided to the user. The user can create the cluster which satisfies the required performance and is small in heat discharge. Other than the heat amount, the various sizing supports can be attained by introducing an index other than the performance.

What is claimed is:

1. A sizing support system for supporting a computer sizing having n level hierarchical resources, comprising:
   a memory;
   a table definition module; and
   a field calculation module,
   wherein the memory stores:
      a lower level resource data indicating a possible kind and a maximum number of lower level resources for each resource belonging to the hierarchical resources; and
      a resource data indicating a parameter of each resource belonging to the hierarchical resources,
   a processing levels of resources to be processed includes:
      a K th level (K is an integer of 1 to n−2) constituted by first resource group;
      a K+1 th level constituted by second resource group; and
      a K+2 th level constituted by third resource group,
      the table definition module is configured to generate a table frame indicating a resource configuration belonging to the first resource group by referring to the lower level resource data, in a unit process applied to the processing levels; and
      the field calculation module is configured to calculate a feature value of the resource configuration by referring to the table frame and the resource data.

2. The sizing support system according to claim 1,
   wherein the resource data includes scalability data indicating a scalability of each resource belonging to the hierarchical resources, and
   the field calculation module calculates a performance of a resource having the configuration indicated in the table frame by referring the scalability data.

3. The sizing support system according to claim 1,
   wherein the field calculation module includes a scale estimation module, the resource data includes scalability data indicating a scalability of each resource belonging to the hierarchical resources, the scale estimation module generates a scale table indicating a performance magnification calculated for the each configuration by referring the scalability data, and the performance magnification is a ratio of a performance of a certain resource to a performance of the certain resource when the certain resource has only one 1 rank lower level resource.

4. The sizing support system according to claim 3, wherein the number of element resources of the second resource group is i, the scalability data of the second resource group is represented by an array $s_{K+1}[i]$, the number of element resources of the third resource group is j, the scalability data of the third resource group is represented by an array $s_{K+2}[j]$, and the scale estimation module calculates the performance magnification indicated by using a following equation, $$S_{ij}=s_{K+1}[i] \times i \times s_{K+2}[j] \times j.$$

5. The sizing support system according to claim 3, wherein the field calculation module further includes a performance estimation module, the resource data includes a unit performance data indicating a unit performance of a resource of the third resource group, and the performance estimation module generates a performance table indicating a performance of the each configuration by multiplying the performance magnification indicated in the scale table and the unit performance indicated in the unit performance data.

6. The sizing support system according to claim 5, wherein the field calculation module further includes a cost estimation module, the resource data includes a cost data indicating a cost of each resource of the hierarchical resources, and the cost estimation module generates a cost table indicating a cost calculated for the each configuration by referring the cost data.

7. The sizing support system according to claim 5, wherein the memory stores a cost table indicating a cost of the each configuration.

8. The sizing support system according to claim 6, further comprising a processing level update module configured to initialize the K to n−2, the processing level update module decrements the K when the unit process is finished, and extracts both the unit performance data and the cost data of the third resource group to be used in a following unit process by referring the performance table and the cost table, and the table definition module and the field calculation module repeatedly execute the unit process for the processing levels corresponding to the every K.

9. The sizing support system according to claim 7, further comprising a processing level update module configured to initialize the K to n−2, the processing level update module decrements the K when the unit process is finished, and extracts the unit performance data of the third resource group to be used in a following unit process by referring the performance table, and the table definition module and the field calculation module repeatedly execute the unit process for the processing levels corresponding to the every K.

10. The sizing support system according to claim 8, further comprising a display configured to display at least one of the scale table, the performance table and the cost table, in a case that the unit process is finished when the K is 1.

11. The sizing support system according to claim 8, further comprising:

a user view generating module; and a display, wherein the user view generating module makes a correlation of at least two of the scale table, the performance table and the cost table in a case that the unit process is finished when the K is 1, and generates a user view data indicating the correlation, and the display displays the user view data.

12. The sizing support system according to claim 11, wherein the user view data indicates a relation between a performance indicated in the performance table and a cost indicated in the cost table, and the display displays the relation for the each configuration.

13. A sizing support method for supporting a computer sizing having n level hierarchical resources, comprising:

(A) a computer storing a lower level resource data indicating a possible kind and a maximum number of lower level resources for each resource belonging to the hierarchical resources into the memory;

(B) the computer storing a resource data indicating a parameter of each resource belonging to the hierarchical resources, (C) the computer setting a processing level; and (D) computer executing a unit processing for the processing level, wherein the computer setting (C) includes:

(a) a K th level (K is an integer of 1 to n−2) constituted by first resource group;

(b) a K+1 th level constituted by second resource group; and (c) a K+2 th level constituted by third resource group, and the (D) includes:

(a) generating a table frame indicating a resource configuration belonging to the first resource group by referring to the lower level resource data stored in the memory; and (b) calculating a feature value of the resource configuration by referring to the resource data stored in the memory.

14. The sizing support method according to claim 13, wherein the resource data includes scalability data indicating a scalability of each resource belonging to the hierarchical resources, and said (b) calculating includes calculating a performance of a resource having the configuration indicated in the table frame by referring the scalability data.

15. The sizing support method according to claim 13, wherein the resource data includes scalability data indicating a scalability of each resource belonging to the hierarchical resources, said (b) calculating includes:

(b1) generating a scale table indicating a performance magnification calculated for the each configuration by referring the scalability data, and the performance magnification is a ratio of a performance of a certain resource to a performance of the certain resource when the certain resource has only one 1 rank lower level resource.

16. The sizing support method according to claim 15, wherein the number of element resources of the second resource group is i, the scalability data of the second resource group is represented by an array $s_{K+1}[i]$, the number of element resources of the third resource group is j, the scalability data of the third resource group is represented by an array $S_{K+2}[j]$, and in said (b1) generating, the performance magnification indicated is calculated by using a following equation, $$S_{ij}=s_{K+1}[i] \times i \times s_{K+2}[j] \times j.$$

17. The sizing support method according to claim 15, wherein the resource data includes a unit performance data indicating a unit performance of a resource of the third resource group, and said (b) calculating includes:
- (b2) generating a performance table indicating a performance of the each configuration by multiplying the performance magnification indicated in the scale table and the unit performance indicated in the unit performance data.

18. The sizing support method according to claim 17, wherein the resource data includes a cost data indicating a cost of each resource of the hierarchical resources, and said (b) calculating includes:
- (b3) generating a cost table indicating a cost calculated for the each configuration by referring the cost data.

19. The sizing support method according to claim 18, further comprising:

(E) the computer initializing the K to n−2;

(F) the computer decrementing the K when said (E) initializing is finished and extracting both the unit performance data and the cost data of the third resource group to be used in a following unit process by referring the performance table and the cost table; and (G) the computer executing repeatedly the unit process for the processing levels corresponding to every K.

20. The sizing support method according to claim 19, further comprising:

(H) displaying at least one of the scale table, the performance table and the cost table, in a case that the unit process is finished when the K is 1.

21. The sizing support method according to claim 19, further comprising:

(I) making a correlation of at least two of the scale table, the performance table and the cost table in a case that the unit process is finished when the K is 1, and generates a user view data indicating the correlation, and (J) computer displaying the user view data on a display.

22. The sizing support method according to claim 21, wherein the user view data indicates a relation between a performance indicated in the performance table and a cost indicated in the cost table, and the relation for the each configuration is displayed on the display in said (J) displaying.

23. A computer readable recording medium recording code for performing a method of realizing a data sizing support method for supporting a computer sizing having n level hierarchical resources, wherein the method comprises:

(A) a computer storing a lower level resource data indicating a possible kind and a maximum number of lower level resources for each resource belonging to the hierarchical resources into the memory;

(B) the computer storing a resource data indicating a parameter of each resource belonging to the hierarchical resources, (C) the computer setting a processing level; and (D) computer executing a unit processing for the processing level, wherein (c) the setting includes:
- (a) a K th level (K is an integer of 1 to n−2) constituted by first resource group;
- (b) a K+1 th level constituted by second resource group; and
- (c) a K+2 th level constituted by third resource group, and the (D) includes:
- (a) generating a table frame indicating a resource configuration belonging to the first resource group by referring to the lower level resource data stored in the memory; and
- (b) calculating a feature value of the resource configuration by referring to the resource data stored in the memory.

* * * * *